Jan. 5, 1960   A. H. BORMAN, JR   2,919,597
THROTTLE VALVE CONTROL FOR AUTOMATIC TRANSMISSIONS
Filed Sept. 6, 1955   8 Sheets-Sheet 1
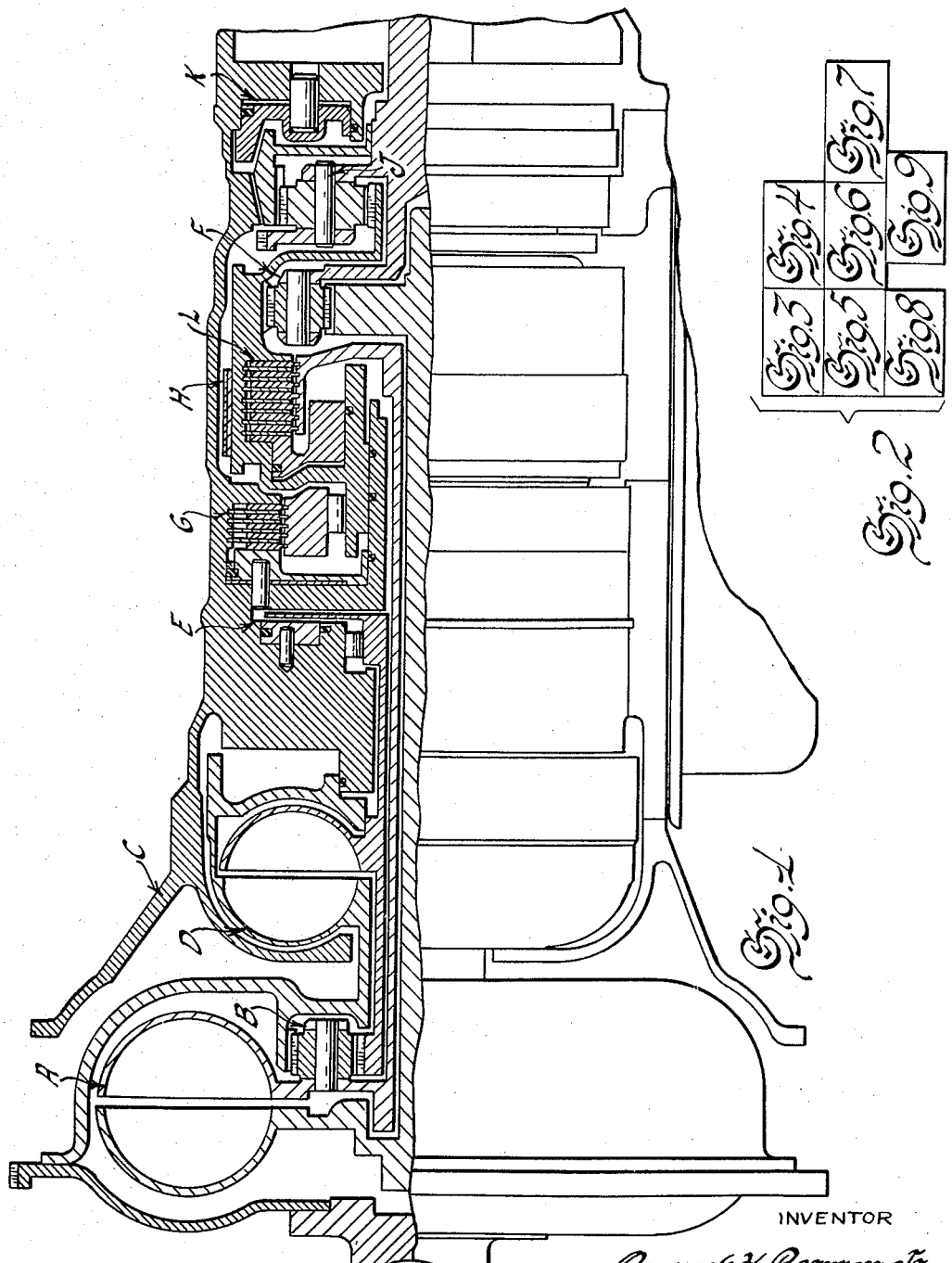
INVENTOR
August H. Borman, Jr.
BY
W. C. Middleton
ATTORNEY

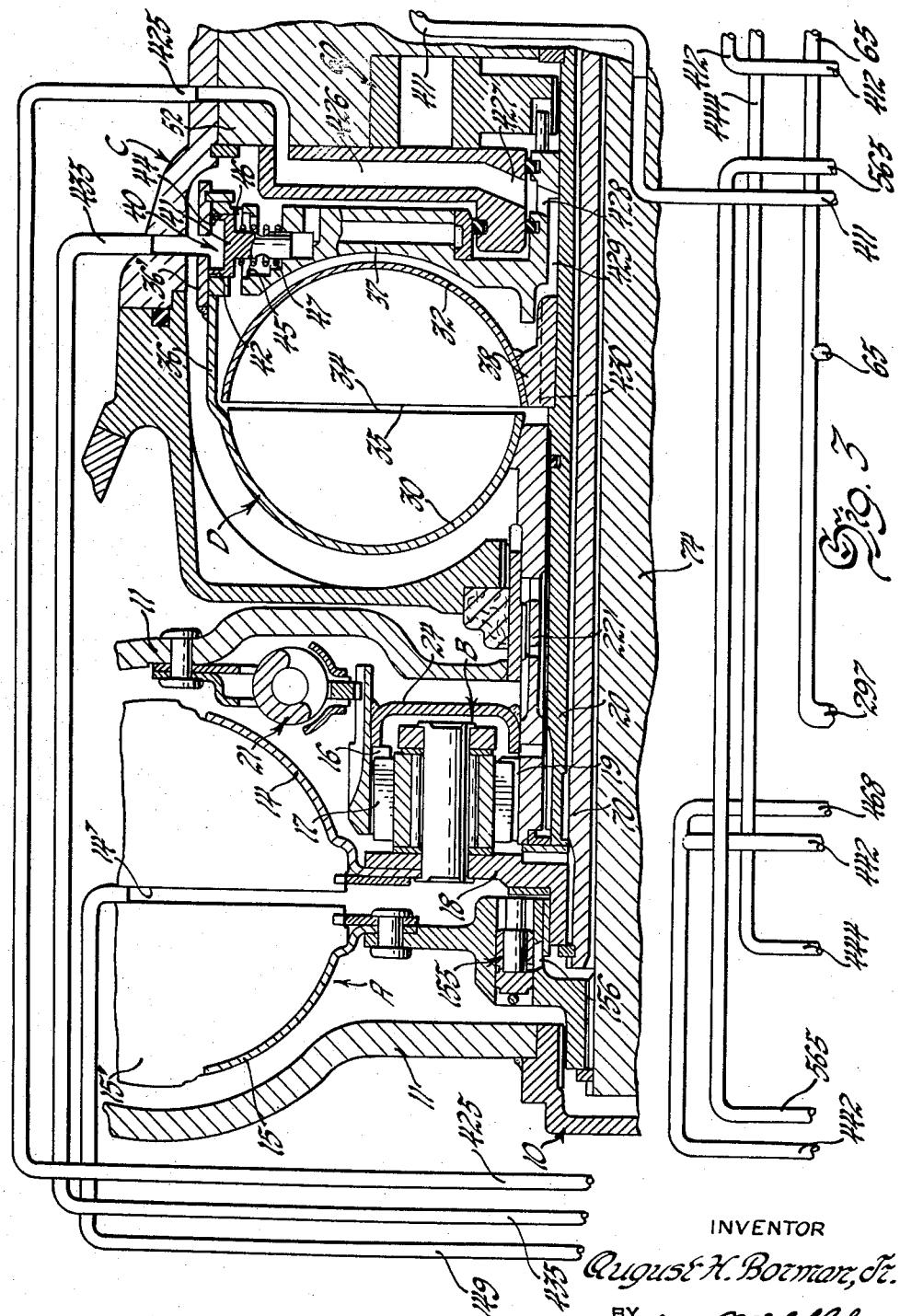

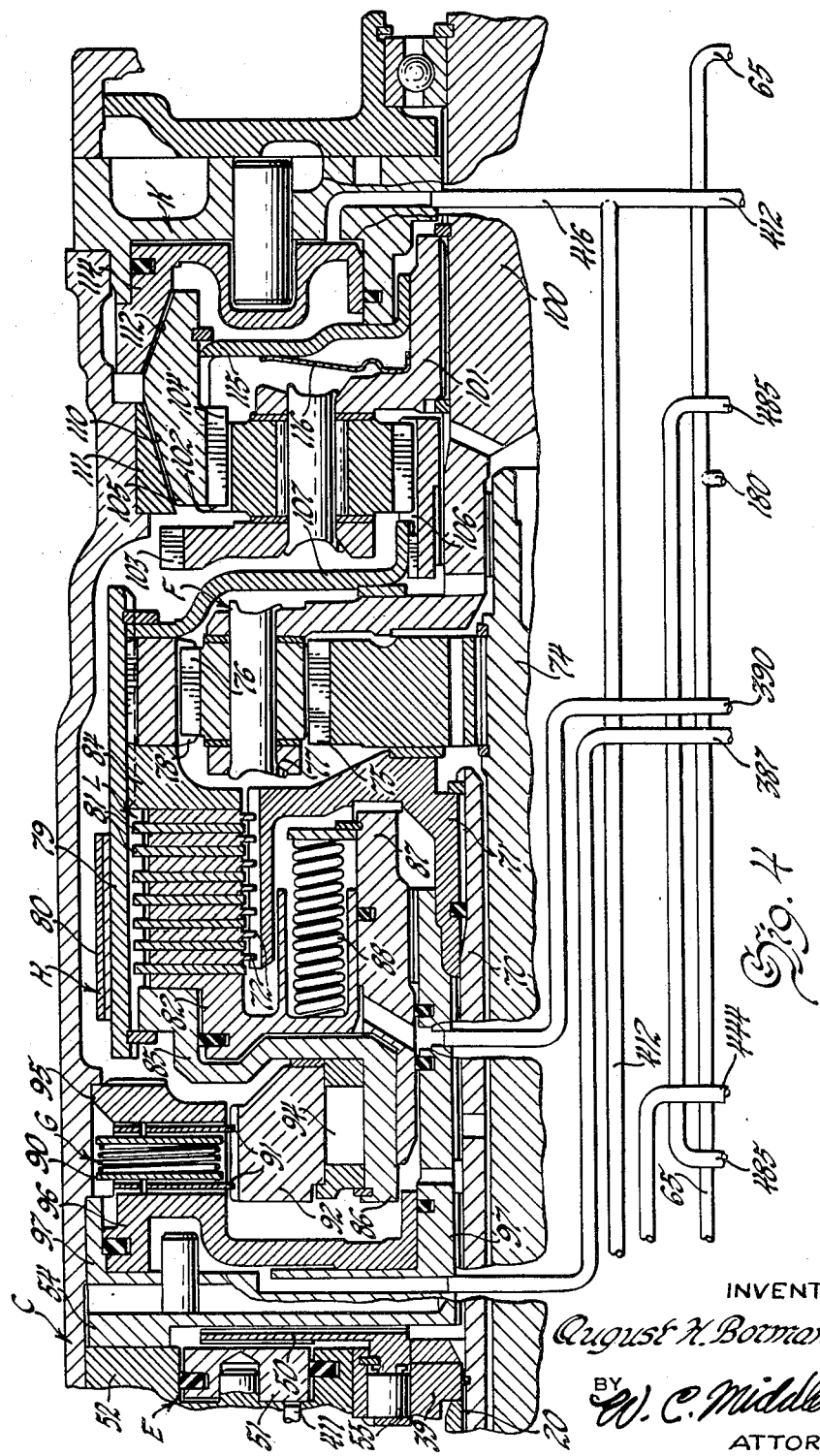

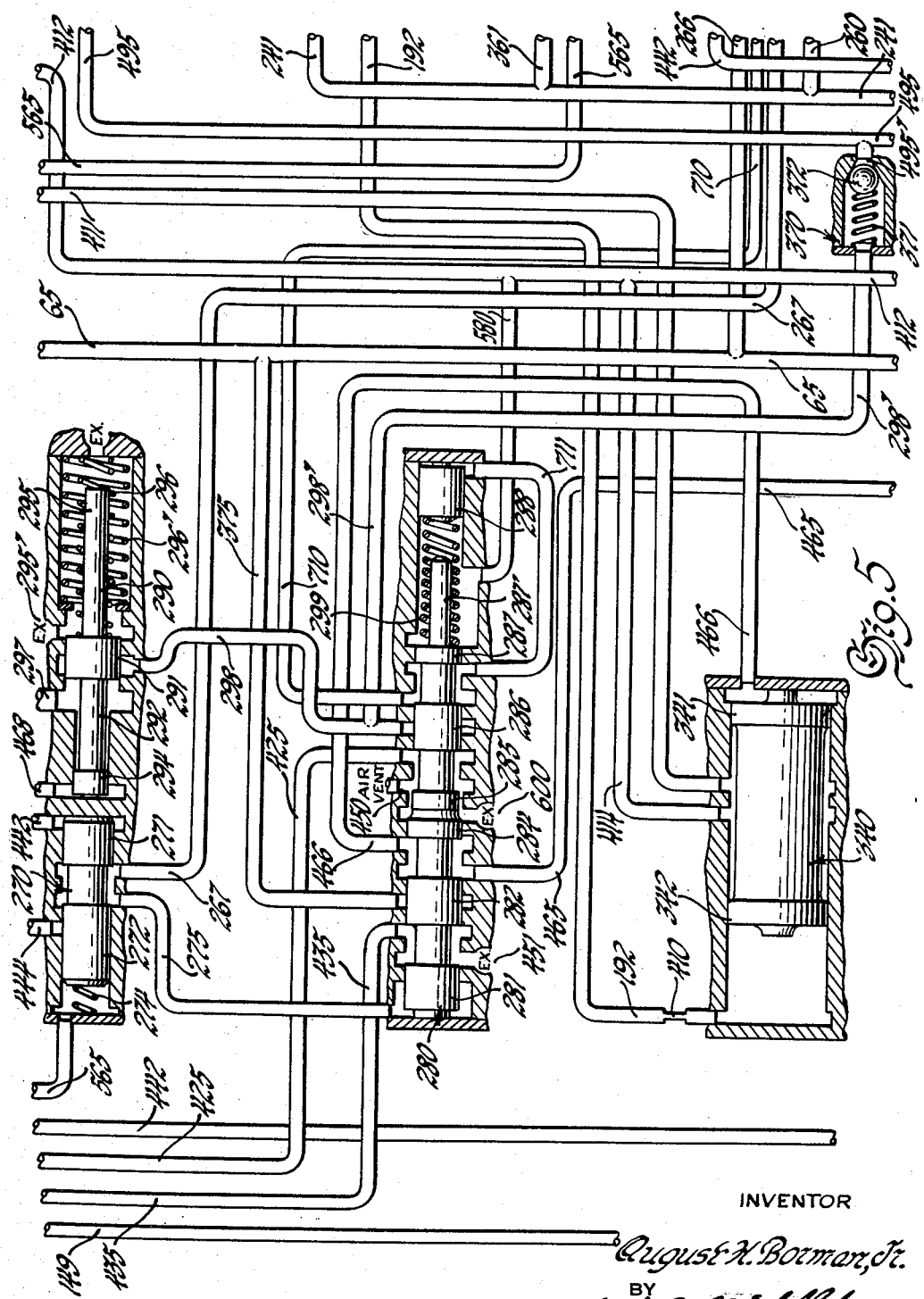

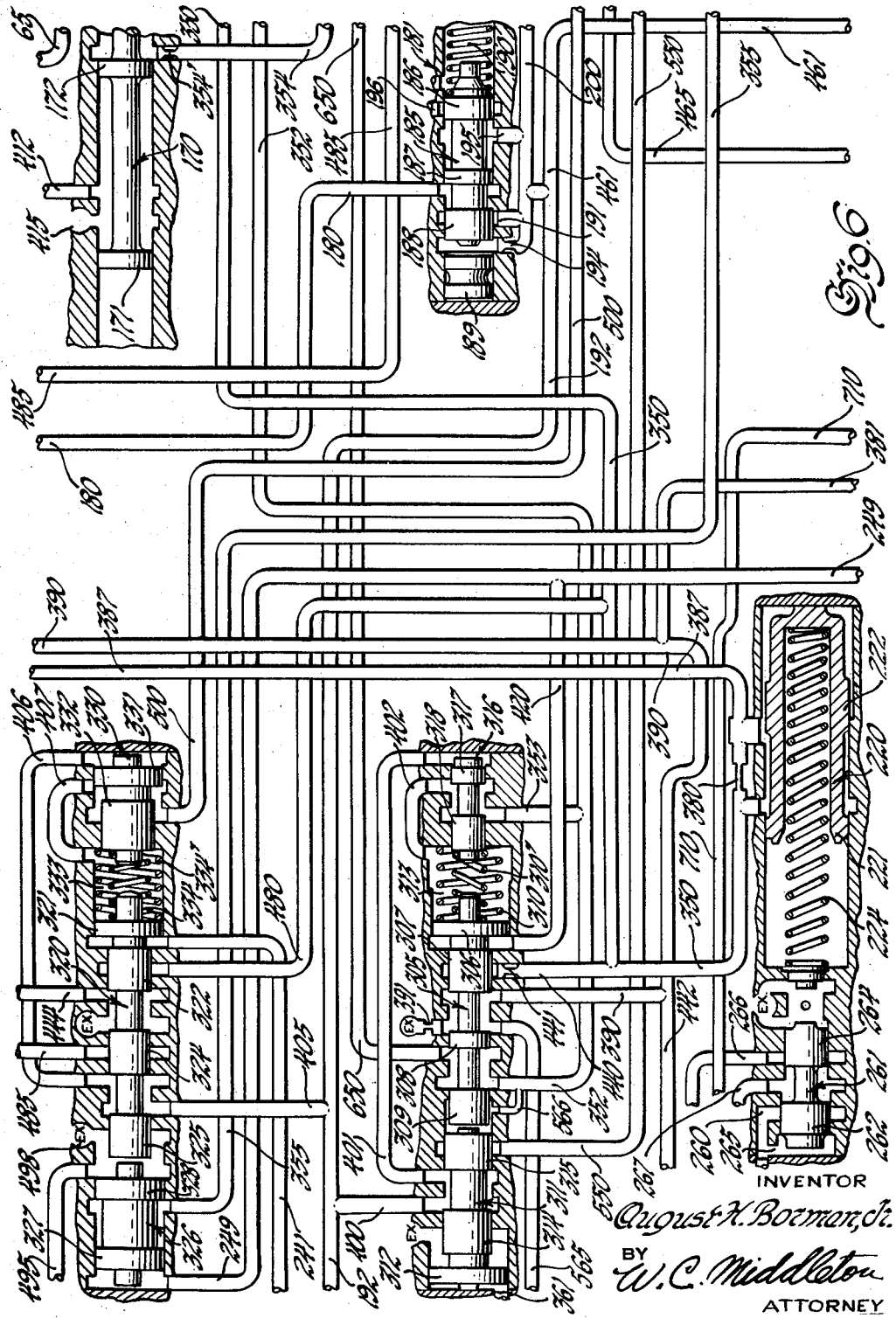

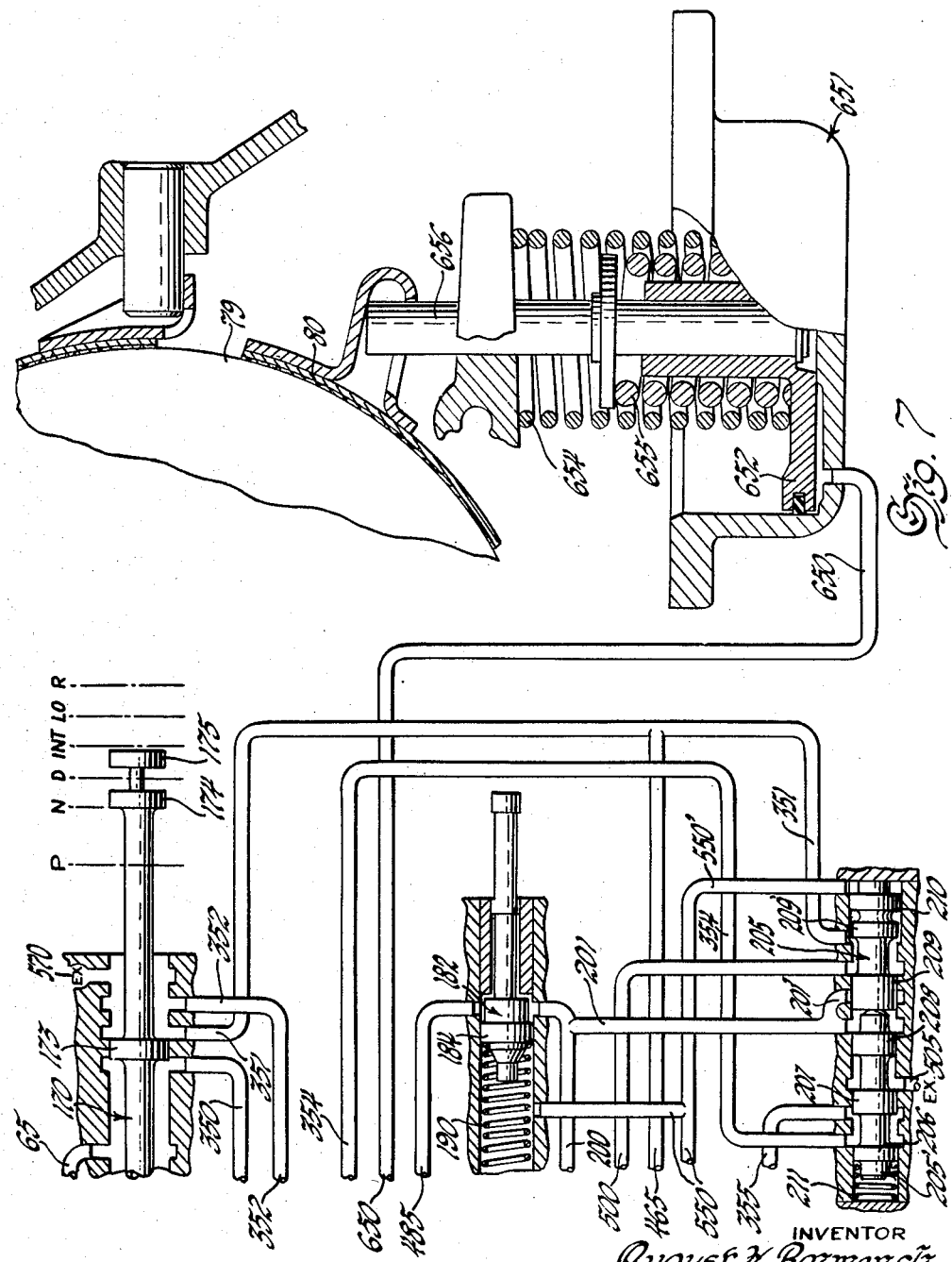

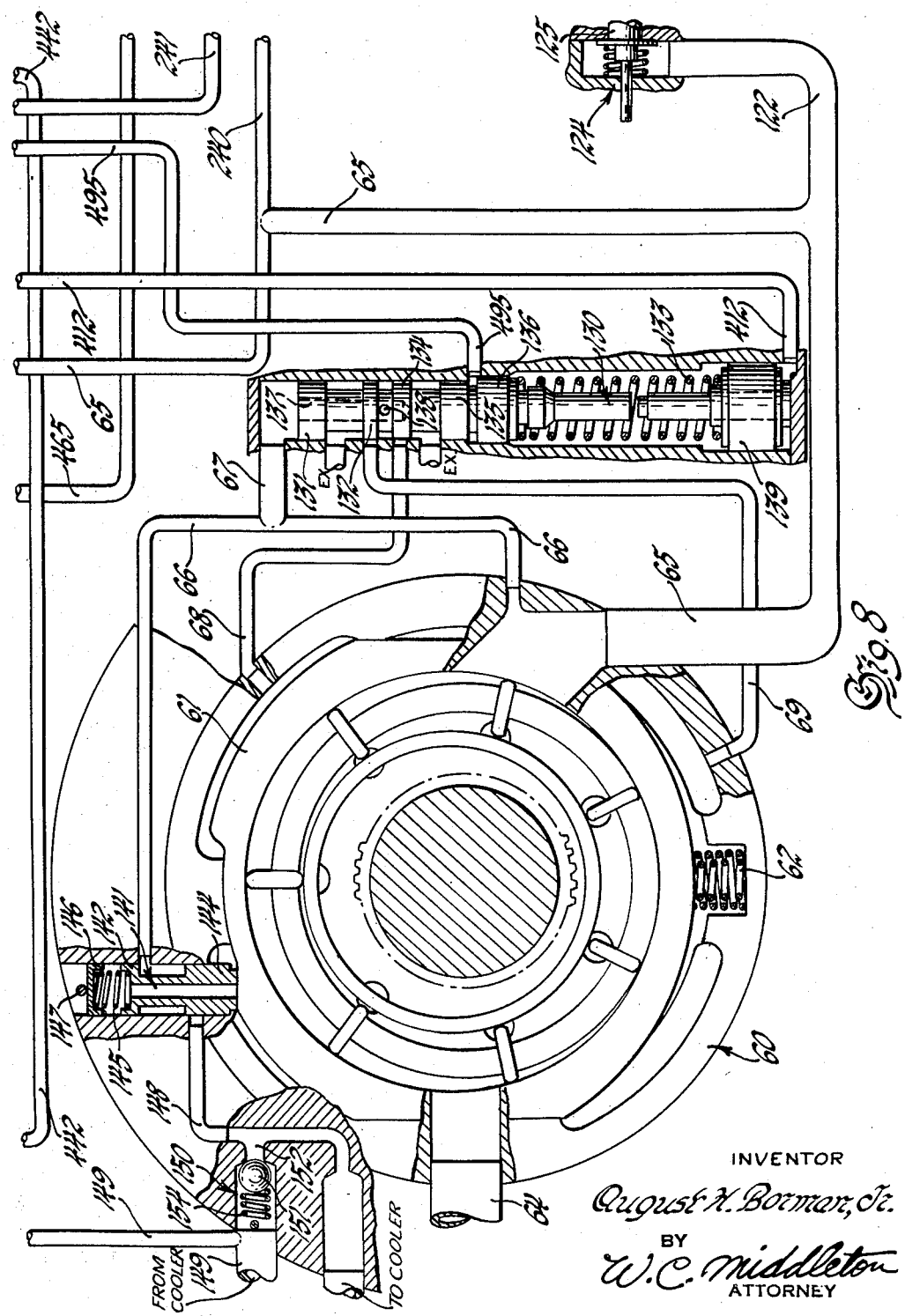

United States Patent Office 2,919,597
Patented Jan. 5, 1960

2,919,597

THROTTLE VALVE CONTROL FOR AUTOMATIC TRANSMISSIONS

August H. Borman, Jr., Detroit, Mich., assignor to General Motors Corporation, Detroit, Mich., a corporation of Delaware Application September 6, 1955, Serial No. 532,549

14 Claims. (Cl. 74—472)

This invention relates to throttle valve controls for controlled coupling transmissions and more particularly to such throttle valve controls for transmissions of that type employing a pair of planetary gear units, both energized for forward drive and having a fluid coupling functionally interposed between the units.

The present transmission is an improvement over that illustrated and described in the copending applications of Walter B. Herndon, Serial No. 393,698, filed November 23, 1953, now Patent No. 2,876,656, for Controlled Coupling Multi-Step Automatic Transmissions, and August H. Borman, Jr., et al., Serial No. 477,832 filed December 27, 1954, for Controlled Coupling Automatic Transmissions.

In transmissions of the type shown in the Herndon and Borman, Jr., et al. applications and of the type incorporated in the present invention, the two planetary gear units can be conditioned respectively for reduction and direct drive, with the conditioning of the two units so coordinated as to provide four forward speed ratios. In addition, the transmission incorporates a third planetary gear unit which can be conditioned to provide reverse drive when the two forward planetary units are concurrently properly conditioned. The change in speed ratio is automatically obtained by the proper conditioning of the gear units through their friction engaging elements such as brakes and clutches, so that under normal driving conditions the transmission will automatically advance from first speed ratio to fourth speed ratio.

The hydraulic control system employed in conjunction with the gear units utilizes various valves for performing functions in association with the friction engaging elements of the gear units.

The present transmission utilizes a second fluid coupling in association with the first planetary gear unit of the transmission, such fluid coupling being so connected to parts of the gear unit that when the coupling is filled and is transmitting torque the unit is conditioned for direct drive therethrough. This gear unit also has a one-way brake element which functions to cause a gear element to provide reaction for reduction drive therethrough when the fluid coupling associated with the unit is emptied and consequently is not transmitting torque. The so-called rear gear unit of this transmission likewise has associated therewith a one-way brake which operates to hold an element of the unit against reverse rotation, thereby to provide the necessary reaction for reduction drive through this unit. The one-way brake element can be released so that this gear rear unit can be properly conditioned for reverse rotation of the transmission output shaft when the reverse rotation unit is actuated. The two units also have associated therewith friction engaging elements or brakes which can be actuated to lock the reaction elements of the respective units against rotation in either direction, whereby engine braking of the vehicle can be obtained even though the transmission of torque may be from the road wheels to the engine.

In addition to the novel features of the mechanical parts of the transmission, other novel features are embodied in the hydraulic control system therefor. Such novel features will be evident from the detailed description of the operation of the mechanism.

An object of the present invention is to provide throttle valve controls for transmissions of the foregoing type in which provision is made for maintaining throttle valve pressure on the shift valve controlling the high speed ratio of the transmission at all times.

Another object of this invention is to provide an arrangement for hydraulically operating a downshift control valve in response to throttle valve position.

Another object of the invention is to provide for the reduction of hydraulic pressure in the system after transmission has become operative in the highest speed ratio together with a valve under throttle valve pressure for restoring the operating pressure of the system to its full value upon a predetermined throttle position.

Another object of the invention is to provide controls whereby maximum pump pressure is supplied throughout the mechanism whenever throttle valve pressure exceeds a predetermined minimum with the transmission operating in its highest speed ratio.

The mechanism and hydraulic arrangements whereby the foregoing objects, and other objects of the invention, can be attained will be evident from the detailed description of an embodiment of the transmission, which embodiment is illustrated in the accompanying drawings, wherein:

Fig. 1 is a schematic illustration of the mechanical construction of the operating mechanism which provides the torque paths through the transmission;

Fig. 2 is a diagram of the manner in which Figs. 3 to 9 inclusive can be combined to illustrate the hydraulic circuits employed; and Figs. 3 to 9 inclusive, when combined, illustrate the entire system in schematic form.

Figure 9:
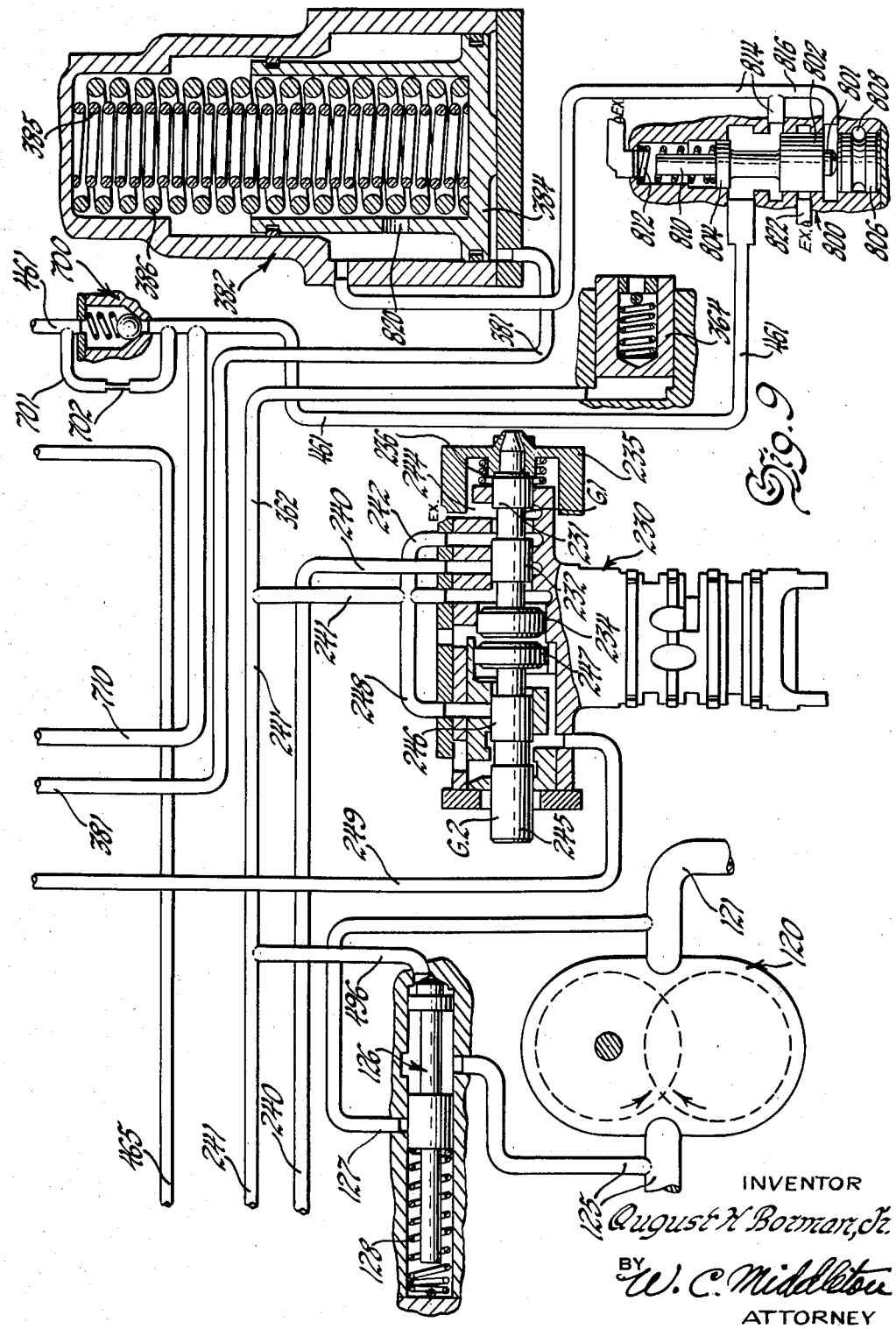

The transmission illustrated in the drawings is composed of a number of operating parts which may be given the following broad terminology. The entire mechanism is enclosed in a casing C, and this mechanism comprises a main coupling A, a front planetary gear unit B, a planetary coupling D, an overrun brake E for the front unit, a rear planetary unit F, a neutral brake G therefor, a direct drive clutch L for unit F, an overrun brake H, a reverse planetary unit J, and brake K therefor.

Referring to the drawings, 10 indicates the input for the transmission and may be attached to or formed as part of the crankshaft of a source of motive power such as an internal combustion engine. The input 10 is connected to a cover member 11 which serves to enclose the main fluid coupling A made up of pump member 14 having blades 14', and turbine member 15 having blades 15'. The cover 11, as shown, substantially completely encloses the coupling as well as a planetary gear set B made up of ring gear 16 meshing with pinions 17 mounted for rotation on a carrier 18. The carrier 18 is connected directly to the pump 14 of the coupling. The other element of the planetary gear set comprises sun gear 19 splined to a sleeve shaft 20. The cover member 11 is connected through vibration eliminating mechanism 21 to the ring gear 16, compelling this ring gear to rotate in unison with the cover. The cover member 11 is also connected to a sleeve member 22, in turn connected by the substantially U-shaped member 24 to the ring gear 16.

The sleeve 22 has on one end thereof the pump 30 of the front unit fluid coupling, indicated generally at D, which also includes as the other element the turbine member 32. The shroud of the pump 30 supports blades 34 while the shroud of the turbine supports blades 35. The shroud of the pump 30 is extended as indicated at 36 for attachment to a closure completing part 37, the hub portion of which is rotatable about the sleeve shaft 29. This portion 37 has mounted therein a plurality of coupling, exhaust, and control valves indicated generally at 40 which will be described in detail hereinafter.

The sleeve shaft 20 has the hub 38 of the turbine 32 splined thereto, and this sleeve shaft 20 is extended to the right and has connected to the end thereof race member 39 provided with a radial extension forming the blade 50 of overrun plate clutch or brake E. A piston 51 mounted in a stationary member 52 attached to the casing C for the entire transmission can be moved under hydraulic pressure to lock the plate 50 to another stationary member 54, also secured to the casing C. One-way brake elements 55 are interposed between a part of the race member 39 and a part of the stationary member 52. The one-way brake elements 55 may be of any well-known character, such as elements of a roller brake or of a sprag brake.

The inner hub part of the pump shroud 37 serves to drive a pressure pump 60 which is mounted in the stationary part 52. The pump 60 will be described in more detail later.

The carrier 18 of the front planetary unit, in addition to being connected to the pump 14 of the main fluid coupling A, is also splined to a sleeve shaft 70 which is extended to the right and has splined thereto a clutch plate carrier 71, which in turn is splined to receive clutch plates 72.

The turbine 15 of the main fluid coupling A has its hub portion splined to an intermediate shaft 74, to one end of which is splined a sun gear 75 of the rear planetary unit F. This rear planetary unit also includes pinions 76 rotatably mounted in a carrier 77 and a ring gear 78 meshing with the pinions which also mesh with the sun gear 75. The ring gear 78 has a drum-like extension 79, the outer surface of which can be gripped by a brake band 80 actuated by a hydraulic servo in the customary manner. The drum 79 is internally splined to receive clutch plates 81 which can be locked to the clutch plates 72 through the agency of a hydraulically actuated piston 82 which can force the plates together against a backing member 84, also carried by the drum 79. Splined to the inner surface of the drum 79 is an irregularly shaped member 85 having an axial extension 86 and which is secured to a generally tubular member 87. A part of the member 85 and a part of the member 87 cooperate in forming a cylinder within which the piston 82 can move axially, such piston being biased in one direction by spring 88 and being moved in the other direction by liquid under pressure.

A part of the casing C is internally splined to receive plates 90 of a so-called neutral brake or clutch G, the other plates 91 of which are splined to a race member 92. The race member 92 is spaced from the tubular extension 86 and cooperates therewith to form a one-way brake including rollers or sprags 94. The plates 90 and 91 can be pressed together against a backing plate 95 secured to the casing C by means of a piston 96, movable axially in a cylinder formed in the part 97 secured to the casing C.

The carrier 77 of the rear planetary unit is formed integrally with or connected to the output shaft 100 of the transmission. This output shaft has splined thereto a part of carrier 101 of the reverse planetary unit J, which carrier 101 rotatably supports a plurality of pinions 102 which mesh with a ring gear 104 formed on the double tapered member 105 and with sun gear 106 which is connected by member 107 to the ring gear 78 of the rear planetary unit F. The part 105 has one conical surface 110 adjacent to a cone member 111 secured to the casing C. The other cone surface 112 of member 105 has adjacent thereto a similar surface of a piston 114 mounted in a cylinder formed in a part of the casing. This piston can be moved to the left by the application of liquid under pressure in a manner to be described later. The part 105 has a substantially disk-like extension 115, the inner end of which bears against the tubular part of the carrier 101. A washer spring 116 normally moves the member 105 to the right so that the cones 110 and 111 are out of engagement.

The transmission operating elements just described are capable of operating in four forward speed ratios and in reverse. For the first speed ratio, which produces the maximum torque multiplication, the front planetary unit B must be conditioned to operate in reduction, and the same is true of the rear planetary unit F. In all forward speed ratios the reverse planetary unit J is idling. To obtain the first speed ratio the sun gear 19 of the front planetary unit B must be held against reverse rotation to provide the necessary reaction, and it is so held by the one-way brake having the rollers or sprags 55. In this ratio the controlled coupling for the front units, i.e., the coupling D, is empty. In the rear unit the reaction element, which is the ring gear, must be held against reverse rotation, and such condition is provided by the one-way brake having the rollers or sprags 94 in cooperation with the neutral brake G which locks the race 92 against rotation.

With the transmission parts so conditioned, the train of torque transmission through the mechanism is as follows. Input 10 rotates the coupling cover 11 which in turn imparts rotation to the ring gear 16 of the front planetary unit B. Reaction being afforded by the sun gear 19 of this unit, the carrier 18 is compelled to rotate in the same direction as the ring gear but at a reduced speed, depending on the ratio of the gear set. Rotation of the carrier 18 causes rotation of the pump 14 of the main coupling A which in turn causes rotation of the turbine 15 connected to drive the sun gear 75 of the rear planetary unit F. With the ring gear 78 of this unit held against reverse rotation, it provides reaction so that the carrier 77 is compelled to rotate in the same direction as the sun gear 75 but at a reduced speed, depending on the ratio of the gear set F. Rotation of the carrier 77 causes a similar rotation of the output shaft 100 which may be connected to or constitute the propeller shaft of the vehicle. Inasmuch as the reverse brake K is released at this time, rotation of the carrier 101, which is splined to the output shaft, will cause rotation of the ring gear 102 due to the reaction afforded by the stationary sun gear 106 connected to the stationary ring gear 78 of the rear unit F. This compelled rotation of the ring gear 104 of the reverse unit J produces no effect.

It will thus be seen that the transmission is operating with both the front and rear units in reduction drive so that the highest torque multiplication ratio of the gear combination is provided.

It will be noted that during the rotation of the ring gear 16 of the front planetary unit by the cover 11, the pump 30 of the controlled coupling D is also rotated, but since this coupling is empty at that time the rotation of the pump is ineffective to interfere with the reaction provided by the sun gear 19.

For second speed it is necessary simply to fill the coupling D with liquid, whereupon rotation of the pump 30 of this coupling, simultaneously with the ring gear 16, will cause rotation of the turbine 32 of the coupling D, which turbine is connected to the sleeve shaft 20 having the sun gear 19 splined thereto. Rotation of the turbine 32 therefore causes rotation of sun gear 19 which is permitted by the one-way brake having the elements 55 therein and eventually, when the coupling reaches its condition of maximum efficiency, the sun gear 19 will rotate at a speed approximating that of the ring gear 16. There will be a slight difference in the speeds of rotation of these two gear elements due to the inherent slip in the fluid coupling D, but such discrepancy is so slight that for all purposes these two elements, i.e., the sun gear 19 and the ring gear 16, are rotating at substantially the same speed, which causes the carrier 18 to likewise rotate at this speed. The front unit therefore is in direct drive condition which reduces the overall reduction ratio of the transmission, it being understood that the rear unit remains in its reduction drive condition.

To obtain third speed a change must be made in the operating conditions of both the front and rear units, and this change in the front unit is accomplished by emptying the controlled coupling D, whereupon the sun gear 19 is no longer driven by the turbine 32 but decelerates and eventually comes to rest, being prohibited from reverse rotation by the one-way brake having elements 55. Substantially simultaneously the rear unit F is conditioned for direct drive which is accomplished by engaging the rear unit clutch L, such engagement locking the ring gear 78 to the sleeve shaft 70 which causes the ring gear 78 to rotate at the same speed as the pump 14 of main coupling A. Such forward rotation of the ring gear is permitted by the one-way brake having the brake elements 94 therein. Under this condition the ring gear 78 rotates at substantially the same speed as the sun gear 75 which is driven by the turbine 15 of the main coupling A. The difference in speeds of these two elements is that due to the inherent slip in coupling A, and this difference is so small that for all practical purposes it may be said that the gear elements rotate at the same speed, causing the carrier 77 likewise to rotate. Third speed ratio therefore comprises reduction drive in the front unit and direct drive in the rear unit.

To obtain fourth speed ratio it is necessary only to again fill the controlled coupling D which automatically changes the drive ratio in the front unit from reduction to direct. Both units therefore in fourth speed ratio operate in direct drive.

To obtain reverse drive through the transmission it is necessary to release the neutral brake G, to engage the reverse brake K, and to empty the controlled coupling D. When the parts are so conditioned, drive will be through the front unit in reduction, as previously described in connection with first and third speed ratios. In the rear unit, however, a different condition exists in that the ring gear 78 is free to rotate in any direction and therefore cannot offer reaction. However, the drive shaft 100, being connected to load, offers an initial reaction which is imparted to the carrier 77 of the rear unit F, initially holding this carrier against rotation. Consequently, rotation of sun gear 75 by the turbine 15 of main coupling A will translate forward rotation into reverse rotation of the ring gear 78 due to the pinions 76 being held against other than pure rotation on their own axes. When the ring gear 78 is compelled to rotate in the reverse direction it likewise compels the sun gear 106 of the reverse planetary unit J to so rotate. With the ring gear 104 of this reverse unit held against rotation, it follows that the carrier 101 must rotate in the same direction as the sun gear 106, but at a reduced rate. The output shaft 100 therefore is compelled to rotate in the reverse direction and such reverse rotation is in turn imparted to the carrier 77, with the end result that the speed of rotation of the ouput shaft in reverse is such as is afforded by the combination of the ratios of the rear unit F and the reverse unit J.

The desired operation or transition from one ratio to another is accomplished automatically by suitable mechanism hydraulically operated. Liquid under pressure for operating the various parts of the mechanism is supplied at times by the front pump 60 and at times by this pump and a rear pump 120. The front pump 60, previously briefly mentioned, is driven at engine speed and hence supplies oil for pressure purposes whenever the engine is rotating. The rear pump 120 is driven by the output shaft 100 in a manner not shown and hence can supply oil only when this output shaft is rotating, i.e., when the vehicle is in motion.

The pump 60 is of the variable capacity type, similar in major details to that shown in the application of Walter B. Herndon S.N. 140,176, filed January 24, 1950, for Variable Capacity Pressure System. Since this pump constitutes no part of the present invention, a detailed description thereof is not deemed necessary, it being sufficient to point out that the pump has a slide 61 movable in a guideway within the body of the pump, and that the remaining parts of the pump are so related to the slideway that the volume of oil discharged by the pump depends on the position of the slide 61 in the body. Referring to the drawing, it will be seen that a spring 62 biases the slide to its uppermost position as viewed in the drawing, which is the position resulting in the maximum volume of liquid discharged by the pump. Liquid such as oil is drawn from a sump (not shown) through a suction line 64, passes through the pump and is discharged through the main supply line 65 which has a parallel line 66 with a branch 67 therefrom. A supply line 68 is in communication with the guideway for the slide near the top thereof while a similar line 69 is in communication with the bottom of the slide. The operation of these lines, in conjunction with a pressure regulator valve indicated generally at 130, will be described in detail later.

The branch line 66 extends to a valve body having a bore in which is slidably mounted a valve member 141 having lands 142 and 144. The valve 141 is biased downwardly by a spring 145 held in position by a cut 146 and a crosspin 147. The valve body 140 has another port to which is connected an oil line 148 which is extended to an oil cooler (not shown). A return line 149 from the cooler extends to the main fluid coupling A to supply cooled oil thereto. The line 149 has a branch passage 150 with ball check member 151 therein and with a reduced portion 152 communicating with the line 148. A suitably calibrated spring 154 holds the ball check member against its seat.

The main coupling A is provided with a relief valve 155 located in the hub of the turbine 15 and calibrated in such fashion that upon a predetermined pressure within the coupling the valve will open, permitting the egress of oil therefrom into the passage 156 and from this passage into lubricating channels throughout the mechanism.

The rear pump 120 may be of the well-known gear type or any other suitable type which can draw oil from the sump through the suction line 121 for discharge into line 122 communicating with the main supply line 65 from the front pump. A check valve 124 permits oil to be fed from the rear pump to the system supply line 65 but prevents oil being discharged through the rear pump from the front pump when the rear pump is idle. A branch line 125 extends to a rear pump by-pass valve 126 and is placed in communication under certain conditions to be described later, with a return line 127 connected to the suction line 121.

*Manual valve*

The main supply line 65 extends to a port in the valve body for the manual valve indicated generally at 170. The body for this valve has a bore in which is slidably bounted the valve which is provided with lands 171, 172, 173, and spaced flange members 174 and 175. These latter members serve to receive a fork or other agency by which the valve 170 can be moved to any of a number of positions, which positions have been indicated by lines with suitable legends. These positions, reading from the left to the right, will be Park, Neutral Drive (Drive 4), Intermediate (Drive 3), Low and Reverse. As is customary in transmissions of this type, the operating lever for moving the valve 170 will usually be positioned on the steering column, in close proximity to the steering wheel of the vehicle. Other ports communicating with the bore of this manual valve and the manner in which these ports are placed in communication with the main supply line 65 will be described in the detailed description of the operation of the system.

Throttle valve

A branch line 180 from the main supply line 65 leads to the bore in the valve body which receives the throttle valve indicated generally at 181. This valve is made up of an accelerator pedal responsive member 182 having a land 184 and a metering part 185 having lands 186, 187 and 188. A spring 190 is interposed between the parts 182 and 185. One end of the bore is closed by a plug 189.

This throttle valve operates as a metering valve in a well-known fashion, that is, as the accelerator pedal or throttle of the vehicle is moved to increase the throttle opening of the carburetor, the part 182 is moved to the left as viewed in the drawings, compressing the spring 190 with resultant movement of the metering part 185 also to the left. When this occurs, the land 188 uncovers a port connected to the line 191, permitting oil from the branch main supply line 180 to enter this line 191 and proceed therefrom into the main throttle valve pressure line 192. When pressure is developed in the parts supplied by the line 192, the result thereof is introduced through the restriction 194 into the bore of the body to act on the left end of the land 188 and, as this pressure increases, it moves the metering part 185 to the right, first closing the port connected to line 191 and next establishing a connection from branch line 195 to exhaust through the bore of the valve at the exhaust port 196. As the part 182 is moved further to the left, a greater developed pressure is required in the line 192 to cause the metering valve part to move to the exhaust position and hence throttle valve pressure, or TV pressure as it will be sometimes called hereinafter, increases as the throttle is opened. This action is well known. A further branch line 200 extends to the bore of the throttle valve body to the right of the part 182, for a purpose to be described later. Line 200 also has a branch line 201 which extends to the detent valve.

Detent valve and pressure drop signal valve

The valve body is provided with a bore in which is slidably mounted a detent valve indicated generally at 205. This valve has lands 209, 209', and 210, the latter being of larger diameter than the lands 209 and 209'. It also has a number of ports connected to oil lines which will be identified in detail later. The pressure drop signal valve is mounted in the same bore in the valve body and is indicated generally at 205'. Valve 205' has spaced lands 206, 207 and 208. The bore of the body is provided with a plurality of ports for connection to oil lines for the desired operation to be hereinafter described. The two valves 205 and 205' are biased to the right as viewed in the drawings by the spring 211.

Neutral brake valve

The valve body is provided with a bore in which is slidably mounted a neutral brake valve indicated generally at 220. This valve is provided with spaced lands 221 and 222, and is biased to the right by spring 224. Ports in the valve body are connected to a number of oil lines which will be identified in the course of describing the operation of the system as an entirety.

Governor

The governor utilized in this transmission is similar in major details to that illustrated and described in Thompson Patent No. 2,204,872, issued June 18, 1940, for Change Speed Gearing and Control. This governor has been illustrated with its oil channels shown in diagrammatic fashion for purposes of clarity. The body of the governor, indicated at 230, is rotated by the output shaft 100. Mounted within the body are two metering valves which function to permit the development of pressure rising in response to increased speed of rotation of the governor. The first metering valve, or G-1, is slidably mounted in a bore in the governor body and has lands 231 and 232 of equal diameters, and a larger land 234. A weight 235 is attached to the outer end of the valve, and this weight is biased outwardly by a spring 236.

Oil supplied to the governor by branch line 240 from main line 65 enters the bore of the body and if the governor is at rest the spring 236 will move the member G-1 to the right sufficiently to cause land 232 to uncover the port connected to the line 240, whereupon the oil will pass through the bore and out the line 241. From this line distribution is made to various parts of the system and a pressure is soon developed which acts on the larger area of the land 234 to move the valve G-1 to the left, closing the port connected to line 240 and opening a branch line 242 to exhaust at port 244, with the oil passing between the lands 231 and 232. The pressure developed with the governor at rest therefore is equal to that necessary to balance the strength of spring 236. When the governor is rotating, centrifugal force acting on the weight 235 moves the valve member G-1 outwardly so that a greater developed pressure in the supply line 241 is necessary to counteract centrifugal force on the weight. It will be seen that this action is similar to that described in the Thompson patent before identified, with the exception that a predetermined developed pressure is delivered by the governor, even when the output shaft is stationary. This present governor also differs from that of the Thompson patent by the omission of a second supply line to the valve member identified as G-2, which member has lands 245 and 246 of equal diameters and land 247 of larger diameter. A branch line 248 from the G-1 supply line 241 conducts oil under the pressure determined by the G-1 valve to the bore in which G-2 valve is slidable. When centrifugal force, acting on the weight of this valve, moves it outwardly, the port connected to line 248 is opened by land 236, permitting oil to pass between lands 246 and 247 and thence outwardly into the G-2 delivery passage 249, to be distributed to various parts of the system. When the pressure developed in the line 249 and acting on the large area of land 247 is sufficient to overcome the effect of centrifugal force on weight 245, the G-2 valve is moved to the right, closing the port connected to line 248 and then opening the line 249 to exhaust at 250. The metering action of the G-2 part of the governor takes place only when the governor is rotating, and the pressure delivered thereby increases at a slower rate than the pressure delivered by the G-1 part thereof. As is customary in mechanisms of this character, the pressure delivered by the G-1 part of the governor will hereinafter be called G-1 pressure, and that delivered by the G-2 part thereof will be called G-2 pressure.

G-5 valve

The G-1 supply line 241 from the governor has a branch 260 extending to the G-5 valve, indicated generally at 261. A bore is provided in the valve body in which is slidably mounted the valve element having lands 262 and 264. These lands are of different diameters, as shown, and are spaced apart. The bore has ports connected to the line 260 directly and through a branch line 265. The body has another port connected to a branch line 266 from the main supply line 65 and a further port connected to the line 267, which line serves as the valve output line.

When this valve is in operation it is normally in the position shown wherein the land 264 closes the port connected to the pump supply line 266. When G-1 pressure is developed by the governor, such pressure is directed to the left end of the valve member through the branch 265, causing the valve member to move to the right, whereupon land 264 opens the port connected to the pump supply branch 266. Oil from this supply branch can then pass from the bore of the valve through the line 267 to another part of the system, to be explained later. The oil passing from the bore through the line 267 will eventually attain a pressure such that its presence in the bore and acting on the left end of land 264 and the right end of land 262 will cause a movement of the valve to the left since the land 262 has a greater area subject to this pressure than the land 264. This movement to the left is opposed by the G–1 pressure and the parts are so calibrated that the delivered pressure from the G–5 valve is approximately five times that of the G–1 pressure acting thereon. In other words, the pressure required to move the valve to the left is five times the governor pressure applied to the valve. When the valve moves to the left, as just described, land 262 opens the port to line 260, so that excess pressure can pass into line 260. This G–5 valve therefore acts as a regulating valve to modulate line pressure in such a fashion that it is reduced to a value of the order just mentioned. The ratio of five is given as an example only, since by suitable calibration the valve can operate to deliver a pressure at any desired ratio relative to G–1 pressure.

Transition valve

The line 267 which receives oil under pressure from the G–5 valve is extended to a port in the body communicating with a bore in which the transition valve, indicated generally at 270, is slidably mounted. This valve has spaced lands 271 and 272. A spring 274 normally forces the valve 270 to the right into the position shown wherein the port communicating with line 267 is connected through the bore with a port connected to line 275. The bore of the transition valve has other ports connected to other lines which will be identified and their functions described later.

Controlled coupling valve

The line 275 from the transition valve is extended to the end of a bore in which is slidably mounted the controlled coupling valve indicated generally at 280. The valve member has a number of lands 281, 282, 284, 285, 286, and 287. A plug 288 is in the bore and is normally biased from stem 287' by spring 299. The function of this valve is to control the filling and emptying of the planetary coupling D, and the manner in which such control is exercised will be evident from the later description of the sequential operation of the transmission.

Limit valve

A valve member indicated generally at 290 is slidably mounted in a bore and is provided with a land 291, a stem 292 and a further land 294. The other end of the valve comprises a stem 295 around which is located a biasing spring 296. One port in the valve body is connected to branch line 297 from the main pump supply line 65 so that oil under pump pressure is introduced into the bore of the valve around the stem 292 in position to act on the left surface of the land 291. When the pressure of the oil so acting on the land 291 exceeds the resistance offered by the spring 296, the valve 290 is moved to the right, whereupon land 291 uncovers a port connected to a line 298 which extends to the controlled coupling valve 280, at which point the oil is arrested by the land 286 of the controlled coupling valve when this valve is in the position shown in the drawing. When the pressure of the oil being supplied to the limit valve drops below the pressure exerted by spring 296 (for example, when coupling D is being filled), this spring restores the limit valve to the illustrated position, closing the port connected to the line 298. Filling of coupling D therefore cannot reduce the pressure in the system to a level low enough to interfere with proper operation.

Another heavier spring 296' can be compressed by land 291 when the pump pressure is excessive for any reason, connecting line 297 to exhaust at port 295', as a safety measure.

Second to third shift valve

A second to third shift valve train is mounted for sliding movement in a stepped bore in the valve body. The train comprises the shift valve proper, indicated at 305, which is provided with a large land 306, an intermediate diameter land 307 and two lands 308 and 309, of equal diameters. A spring 310, positioned in the valve bore, normally biases the shift valve to the left to the extent permitted by the governor plug valve indicated generally at 311, such valve having a large land 312 and lands 314 and 315 of equal diameters. The train is completed by a regulator plug valve indicated generally at 316 which has lands 317 and 318 of equal diameters. Spring 310' is interposed between the land 306 of the shift valve and land 318 of the regulator valve. The bore of this valve is provided with a plurality of ports connected to various oil lines which will be identified in the course of describing the operation of the hydraulic system.

Third to fourth shift valve

A third to fourth shift valve train is mounted in a stepped bore in the valve body, such train comprising the third to fourth shift valve proper, indicated generally at 320, such valve having a large land 321, an intermediate diameter land 322 and lands 324 and 325 of equal diameter. A governor plug valve, indicated generally at 326, has lands 327 and 328 of equal diameters. The train is completed by a regulator plug valve indicated generally at 330, such valve having lands 331 and 332 of different diameters. A spring 334 is interposed between the land 332 of the regulator plug valve 330 and the land 321 of the shift valve 320. Another spring 334' is positioned between land 321 and a shoulder in the valve bore. The bore of this valve train, like that of the second to third shift valve train, is provided with a plurality of ports connected to oil lines which will be identified later.

Front unit brake valve

A front unit brake valve, indicated generally at 340, is mounted in a bore in the body and has lands 341 and 342 of equal diameters. This valve, which controls the engagement of the front unit overrun brake E, is operated only under certain conditions which will be described in conjunction with the identification of various oil lines connected to ports of the valve.

The operation of the hydraulic system in conjunction with the various parts of the mechanism previously described, and also in conjunction with other parts which have not been described in detail, will be apparent from the following.

Park and neutral

The manual valve 170 has two positions, Park and Neutral, in either of which it can be positioned for starting the engine. In the Park position the linkage connected to the manual valve also controls a dog or pawl member (not shown) which engages the locking teeth 103 on the carrier 101 of the reverse unit. Inasmuch as this carrier is splined directly to the output shaft 100, engagement of the dog with the teeth 103 positively prevents rotation of the output shaft and hence of the wheels of the vehicle driven by the output shaft. It is contemplated that the engine of the vehicle can be started when and only when the manual valve 170 is in either the Park or the Neutral position. When the engine is started, the front pump 60 is immediately driven, drawing oil from the sump through the line 64 and feeding it to various parts of the system through the main pump supply line 65. As the pump 60 is driven, the regulator valve, indicated generally at 130, operates to regulate pressure delivered by the pump. This operation will be evident from the following description of the valve 130. The valve member is mounted in a bore and has lands 131, 132, 134 and 135 of the same diameter, and a land 136 of larger diameter. One end of the valve member is hollowed out, as indicated at 137, leading to a cross-orifice 138 positioned between the lands 132 and 134. A spring 133 is positioned between the land 136 and a plug 139 in the end of the valve bore. This spring 133 is of such tension as to cause the pressure of the delivered oil to be maintained substantially at a predetermined value, such as 95 p.s.i. When the pump begins operating and supplies oil to the main supply line 65 it also supplies oil to the branch line 67 leading to the upper end of the regulator valve 130. If this pressure is below the predetermined desired value, spring 133 pushes the main part of the valve upwardly, placing the port 138 in communication with the line 69 which supplies oil to move the slide 61 to its maximum delivery position. As the pressure reaches the predetermined maximum, or even tends to exceed the same, the oil acting on the area represented by the upper end of the main valve forces this main valve downwardly against spring 133, placing the port 138 in communication with the line 68, thereby supplying oil to move the slide 61 downwardly to reduce the volume of the pump output. The valve therefore reciprocates between positions establishing communication with the lines 68 or 69 so that the slide 61 has its position controlled to supply a volume of oil sufficient to create the desired output pressure. When the slide 61 is moved downwardly in its regulated action, it will permit the valve 141 to uncover the port connected to line 148, placing this line 148 in communication with the pump branch line 66 so that oil is immediately supplied to the cooler and from the cooler through the line 149 to the main coupling A.

The action just described takes place almost instantaneously so that within a very short time after the engine has been started oil is supplied to the main coupling A, filling the same, and when the pressure within the coupling reaches a value exceeding that for which the relief valve 155 is set, this valve opens so that oil from the coupling can be distributed through lubrication channels (not described in detail) throughout the mechanism. Should the lines leading to and from the cooler become blocked for any reason, the ball check valve 151 will be unseated when the biasing resistance of spring 154 is overcome. In this fashion supply of oil to the coupling A is assured.

With the manual valve 170 in either Park or Neutral position, it will be seen that oil is supplied by the main supply line 65 directly to the manual valve, entering the bore of the same between the lands 172 and 173. Land 173 in either Park or Neutral is positioned to the left of line 350, with the result that this line as well as lines 351 and 352 are connected to exhaust at the open end of the valve bore. However, oil is immediately supplied to a port connected to line 354 through restriction 354', and the line 354 is extended to a port connected to the bore of the detent valve between the lands 206 and 207 thereof. The oil continues from the bore at this point through the line 355 to a port communicating with the bore of the third to fourth shift valve between the lands 327 and 328 of the governor plug valve 326, at which point further progress of the oil is arrested.

Oil is also supplied from the branch 240 of main pump line 65 to the governor 230 and even though this governor is at rest a G–1 pressure in the order of 5 p.s.i. is immediately developed due to the spring 236 acting to hold the weight 235 outwardly. This relatively low G–1 pressure is immediately delivered through the line 241 and branches thereof as follows. A branch 260 is directed to the G–5 valve as previously described. A further branch 361 leads to the left end of the land 312 of the second to third governor plug valve 311, before described. The line 241 is extended to the bore of the third to fourth shift valve between the lands 321 and 322 thereof. A further branch line 362 is extended to a reverse blocker which has a piston 364 on which the oil exerts pressure. This piston is connected with mechanism of a well-known type which operates to prevent the manual valve from being placed in the reverse position when governor pressure reaches a value which represents a predetermined relatively low speed of the vehicle; for example, 7 to 8 m.p.h. The low G–1 pressure developed while the governor is at rest is not high enough to move the piston 364 of the reverse blocker so that this piston will not interfere with movement of the manual valve to reverse position while the vehicle is at rest.

Oil from the main pump line 65 is also supplied through the branch line 180 to the throttle valve 181, at which point it is arrested so long as the throttle remains in the closed position which is that illustrated in the drawing. Oil is also supplied through the branch line 297 from the main pump supply line 65 to the limit valve 290, at which point it applies pressure to the land 291, moving the same against spring 296 to uncover the port connected to line 298 which extends to the land 286 of the controlled coupling valve, at which point further progress is arrested. However, oil can continue through branch line 298' to the check valve 370, aiding the spring 371 in holding the ball 372 on its seat. A further branch line 375 from the main supply line 65 extends to a port connected to the bore of the controlled coupling valve 280 in position to have further progress blocked by the land 282 of this valve.

From the foregoing it will be seen that with the manual valve in either Park or Neutral positions and with the engine running, the only hydraulic action taking place is that of supplying oil to the main coupling A and also to the governor 230 for the production of a low G–1 pressure, which in turn is multiplied by the G–5 valve 261, with the resultant modulated line pressure or G–5 pressure being supplied to the line 267, to the transition valve 270, and thence through line 275 to the left end of land 281 of the controlled coupling valve 280. This G–5 pressure is not sufficient to move the controlled coupling valve 280 against the resistance of spring 299 which is of such strength as to require a G–5 pressure developed as the result of car movement of a predetermined number of miles per hour. The controlled coupling valve therefore maintains its illustrated position. During this phase of operation the remaining parts of the hydraulic system leading to the controlled coupling D, the controlled coupling exhaust valves 40, the front unit overrun brake E, the neutral brake G, the rear unit direct drive clutch L, the overrun brake H and the reverse brake K are all connected to exhaust. These various connections to exhaust will be further described at the end of the description of the sequence of operation of the mechanism.

When it is desired to propel the vehicle in a forward direction the manual valve may be positioned in the D or Drive Range 4 position, Intermediate or Drive Range 3 position, or Low position. The operation following such positioning of the manual valve 170 will be described in the sequence just outlined.

*Drive range 4*

When the manual valve 170 is placed in the Drive Range 4 position, i.e., that illustrated, oil supplied by the main pump line 65 to the bore of the manual valve immediately passes therefrom through the line 350 to the neutral brake valve 220 into the bore thereof between lands 221 and 222. From the bore the oil passes through a port connected to line 387 which extends to the cylinder containing piston 96 of the neutral brake G. Oil also passes to the right end of the bore of the neutral brake valve to act on the entire end area of this valve to force it to the left. When the valve 220 is moved to the left the first action thereof is for land 222 to close the port connected to line 387, compelling the oil in line 350 to be fed to the line 387 through restriction 380. Continued movement of the valve 220 to the left will finally move the land 222 to a position to the left of the port connected to line 350 so that oil can again pass through the bore from the line 350 to the line 387.

From the foregoing it will be seen that oil at full pressure and full volume is initially supplied to the piston 96 to cause initial movement of the plates thereof to bring the same into engagement without the final locking engagement thereof. The oil necessary for the final engagement of the plates of the brake G is supplied at a reduced rate through the restriction 380. After the plates have been fully engaged, oil is again supplied at full volume to hold these plates engaged. The valve 220 therefore acts in the manner of an accumulator to cause a timed application of the brake. This accumulator action therefore softens the brake engaging action since it will be understood that with the main coupling A filled and the engine idling, the sun gear 75 of the rear unit F will be driven by the turbine 15 of coupling A, causing rotation of the ring gear 78 in the reverse direction due to the reaction afforded by the carrier 77 and its pinions 76. This reaction is due to the carrier 77 being connected to the output shaft 100 which is stationary. Reverse rotation of the ring gear 78 causes reverse rotation of the race member 92 through the one-way brake elements 94. Plates 91 of the neutral brake G therefore will be rotating in reverse direction and such rotation will be arrested so that the race 92 will be held stationary to prevent reverse rotation of the ring gear 78 through the one-way brake elements 94. The accumulator action therefore serves to complete a smooth progressive engagement of the brake G, locking the race 92 against movement relative to the casing C. This conditions the transmission for drive not only through the front planetary unit B but also through the rear planetary unit F, which drive will occur when the engine is accelerated beyond its idling speed. During idling the load on the output shaft 100 is sufficient to overcome the torque transmitted by the main coupling A at engine idling speed, and the slip of this coupling therefore at low idling speed will normally prevent creep of the vehicle.

*First speed ratio*

When the neutral brake G has been applied, the transmission, as before mentioned, is conditioned for drive in first speed ratio, that is, in reduction in both the front unit B and the rear unit F. This drive will take place with increased engine speeds. The transmission of torque for first speed ratio is from the engine output to the transmission input 10, through the coupling cover 11 and the vibration reducer 21 to the ring gear 16 of the front planetary unit B. Since the sun gear 19 of this unit is held against reverse rotation by the one-way brake elements 55, the sun gear affords reaction so that the pinions 17 and the carrier 18 are rotating in the same direction as the ring gear 16 but at a reduced speed, driving the pump 14 of coupling A. With sufficient speed of the pump 14, sufficient torque will be transmitted to the turbine 15 and by it through the intermediate shaft 74 to the sun gear 75. Since ring gear 78 is held against reverse rotation by the one-way brake elements 94 located between the extension 86 of the ring gear and the locked race 92, the pinions 76 and carrier 77 are compelled to rotate in the same direction as sun gear 75, but at a reduced rate, thereby driving the output shaft 100 at the same rate. Thus the transmission provides the highest reduction gear ratio since both the front and rear planetary units are operating in reduction drive.

As the throttle of the engine is opened to cause acceleration thereof, simultaneously a connection from the throttle to the throttle valve causes movement of the valve member 182, having land 184, to the left, compressing spring 190 which in turn applies a force to move the valve element 185 to the left, whereupon the throttle valve initiates its regulating action, supplying a regulated pressure to the supply line 192. This throttle valve pressure, or TV pressure, is directed immediately through the line 192 to the front unit brake valve 340, entering the bore thereof through restriction 410. Simultaneously oil at TV pressure is supplied through the branch line 200 to the right end of the land 184 of the throttle valve element 182, applying a pressure thereto which aids the operator in advancing this element to compress spring 190. Inasmuch as the regulated TV pressure increases with throttle opening, it follows that this supply of pressure to the throttle valve element 182 provides an auxiliary assistance to overcome the resistance to throttle valve movement. Simultaneously TV pressure is supplied through the branch line 400 from line 192 to the bore of the second to third shift valve train between the lands 314 and 315 of the governor plug valve 311. The oil can continue from this bore through the line 401 to the right end of land 317 of the regulator plug valve 316. As the regulated TV pressure increases it will move the regulator plug valve 316 to the left, causing the land 317 to uncover a port connected to line 402 which extends to the bore containing the springs 310 and 310', at which point it can act on the right end of land 306 of the second to third shift valve 305 to aid spring 310 in holding this valve in its illustrated position which is the downshift position.

The regulator plug valve 316 acts to modulate the regulated throttle valve pressure. Spring 310' opposes movement of the valve 316 to the left and when the port connected to line 402 is opened by land 317, the oil under throttle valve pressure entering the spring chamber 313 can act not only on land 306 of the second to third shift valve 305 but also on the left end of land 318 of the regulator valve 316. When the pressure of the oil in the spring chamber 313, augmented by spring 310' is high enough to overcome the pressure on the right end of land 317, the valve 316 will be moved to the right, placing the port connected to line 402 in communication with a port connected to line 353 which is in communication with line 352 extending to exhaust at the open end of the manual valve 170. Modulated pressure is thus obtained.

TV pressure is also supplied through the branch line 405 from line 192 to the bore of the third to fourth shift valve 320 between lands 324 and 325. From this bore it can continue through line 406 to the right end of the land 331 of the regulator plug valve 330, forcing this plug valve to the left against spring 334 until the land 331 uncovers a port connected to passage 407 which extends to the spring chamber 333 in the bore between the land 321 of valve 320 and the land 332 of plug 330. The oil in this space applies a force to the land 321, aiding spring 334 in holding the third to fourth shift valve 320 in its illustrated downshift position. The plug valve 330 also serves to modulate throttle valve pressure in a manner similar to that described in connection with the second to third regulator plug 316. Oil in spring chamber 333, assisted by spring 334, can move the valve 330 to the right, connecting line 407 with line 500 which extends by way of the detent valve to line 351, in turn connected to exhaust at the end of the manual valve 170. Spring pressure and opposing oil pressures therefore combine to modulate the pressure maintained in spring chamber 333.

Oil under throttle valve pressure is supplied through the line 461 to the accumulator 382. Line 461 has a ball check valve 700 therein so biased as to oppose flow to the accumulator but to permit ready flow in the opposite direction. In order that oil can reach the accumulator a bypass line 701, with restriction 702 therein, is shunted around the ball check valve 700. Due to this arrangement oil supplied by the throttle valve must pass through the restriction 702, with a delay in the development of pressure beyond the check valve 700, depending on the size of the restriction.

A branch line 710 from line 461 extends to the controlled coupling valve 280 to enter the bore thereof between the lands 286 and 287. The oil can continue through the line 711 to the right end of the plug 288 to move it to the left against the resistance of spring 299, Oil under TV pressure supplied through the line 192 and restriction 410 to the bore of the front unit brake valve 340 acts on the left end of land 342 thereof to hold this valve 340 in its illustrated position, which causes the brake E to be exhausted. Restriction 410 controls the flow of oil into and out of the bore of valve 340. The line 411, which extends to the piston 51 of the brake E, is connected to a port in communication with the bore of the valve 340 between lands 341 and 342. Also in communication with this bore between the same lands is a branch line 414 of the line 412 which extends to a port in the manual valve body between the lands 171 and 172 thereof. The bore of the manual valve body, when the lands are in the position shown, communicates with exhaust at the port 415. Consequently, any oil which may have been present in the cylinder adjacent to piston 51 is exhausted through the path just traced. The reverse brake K also has its piston exhausted through a branch line 416 which communicates with the line 412.

As the vehicle accelerates in first speed ratio, the governor 230, driven by the output shaft 100, also rotates which causes the development of higher G–1 pressure, which higher pressure in turn is fed to the G–2 part of the governor, with the result that this valve part also meters the G–1 pressure to develop a pressure, which may be called G–2 pressure, in the line 249 which extends to the left end of land 327 of governor plug valve 326 in the third to fourth shift valve train. A branch line 420 from line 249 extends to a port connected to the bore of the second to third shift valve 305 between the lands 306 and 307. Due to the land 306 being larger than land 307, the G–2 pressure acting thereon exerts a greater force on the larger land.

When the output shaft 100 is rotating, the rear pump 120 is also rotating, drawing oil through the suction line 121 from the sump and discharging oil through the check valve 124 into line 122 which communicates with the main pump supply line 65. Such delivery of oil however will occur only when the pressure developed by the pump 120 exceeds the pressure from the front pump 60 acting on the check valve 124. Also some of the oil from the rear pump 120 is diverted to the bore of the bypass valve 126.

The transmission will continue operating in first speed ratio until conditions are reached which require a shift to the next speed ratio. It should be noted that when the output shaft attains a speed to drive the vehicle at from 7 to 8 m.p.h., the G–1 pressure developed by the governor will be high enough to move the reverse blocker piston 364, which, through mechanical linkage not shown, prevents movement of the manual valve 170 to its reverse position.

*Shift first to second*

When the output shaft 100 driving governor 230 reaches a speed such that G–1 pressure acting on the G–5 valve 261 causes that valve to develop pressure in the lines 267 and 275 high enough to overcome the spring 299 as augmented by TV pressure supplied in the lines 710 and 711 to the plug 288 of the controlled coupling valve, this valve 280 will be moved to the right the full distance permitted by the stem 287' extending from land 287. Movement of the controlled coupling valve 280 to the right depends both on vehicle speed and on throttle position. For light throttle opening, with consequent low throttle valve pressure, the supply of this pressure to the right end of the plug 288 moves this plug to the left, compressing spring 299 so that it exerts a greater resistance to the movement of the valve 280. As the opening of the throttle is increased and throttle valve pressure increases, plug 288 is moved progressively further until eventually it is in contact with the end of stem 287, at which time the valve 280 is subject to throttle valve pressure only in one direction. At full throttle therefore greater governor pressure is required to move the valve 280 to accomplish the first to second shift than is required at a lower throttle opening. Land 281 is of larger diameter than plug 288, so that even if equal oil pressures are acting thereon, the force exerted on land 281 will be greater than that on plug 288, causing the desired movement of valve 280. When such movement of valve 280 occurs oil is supplied simultaneously through two passages to the controlled coupling D. Oil through the branch 297 from main line 65, the limit valve 290, and line 298 enters the bore of the controlled coupling valve between the land 286 and land 285. The oil immediately departs from this bore through the line 425 which extends to a channel in a fixed member connected to casing C, which channel is indicated at 426. This channel in turn communicates with a groove 427 in the hub part of the coupling shroud 37, which groove has a sloping passage 428 connected thereto and also connected to a passage 429 leading to a through channel 430 in the hub of the coupling turbine 32. This passage 430 communicates with the space between the hubs of the turbine and the pump 30 so that the coupling can be filled with oil under main pump pressure. At the same time the branch line 375 from main line 65 places the bore of the controlled coupling valve 280 between lands 281 and 282 in communication with a line 435 which extends to the coupling exhaust valve indicated generally at 40. The manner in which oil in this line 435 acts on this valve has been shown diagrammatically, but it is to be understood that inasmuch as several similar valves are employed, the supply of oil thereto must necessarily be through channels formed in the rotating shroud 37 in which the valves 40 are mounted in such fashion that it eventually reaches the top or outer surface of each valve, being confined by a ring 36' secured to this shroud 36.

The particular exhaust valve 40 is the subject matter of an application wherein it will be illustrated in detail. For the purpose of explaining the present invention it will be sufficient to point out that the valve has a head portion indicated at 41 with an annular flange part 42, the outer edge of which is chamfered as at 44. The flange part 42 slides in a slideway which terminates at a shoulder 45 and which has a cross-exhaust passage 46. A spring 47 aids centrifugal force in moving the valve outwardly.

When oil is supplied through the line 435 to act on the cup-shaped end of each valve, such valve is pressed inwardly against spring 47 and against centrifugal force. As the valve moves inwardly the lower surface of the flange part will move across the exhaust passage 46, sealing it, and eventually come to rest on the shoulder 45. In this position the chamfered upper edge 44 will clear the inner part of the passage 46 and also the outer part thereof sufficiently to permit a small quantity of oil to pass around this entire chamfered area. In this fashion, any sediment or the like which may have collected in the valve bore will be flushed therefrom. With the exhaust passage 46 closed and with oil being supplied to the hub of the coupling D from the line 425, the coupling is immediately filled and any substantial leakage therefrom is prevented.

As the coupling D becomes filled there is a gradual change in its condition from a stationary turbine 32 to a rotating turbine 32, and the rotation of this turbine is accelerated to its maximum very rapidly. The maximum speed of rotation of the turbine approximates that of the pump turbine with the exception of that difference which is due to the inherent slip in devices of this type.

When the turbine 32 rotates it drives the sleeve shaft 20 and the sun gear 19 in the same direction as the direction of rotation of the pump 30. Such rotation of the shaft 20 is permitted by the brake having the elements 55 therein. When the sun gear is so driven its speed of rotation is approximately the same as that of the ring gear 16, with the result that the pinions 17 and carrier 18 are likewise so rotated. The front unit, therefore, instead of being conditioned for reduction drive, is conditioned for direct drive. The rear planetary unit F remains in the same reduction drive condition. Thus the transmission has an overall reduction ratio equal only to that in the rear unit.

The vehicle will continue operating in the second speed ratio until a vehicle speed is reached in relation to throttle position which will cause an automatic advance to the next gear ratio.

*Shift second to third*

When the vehicle has attained a speed which causes the development of both G–1 and G–2 pressures, which are applied respectively to the land 312 of the governor plug valve 314 and the land 306 of the second to third shift valve 305, these two forces acting conjointly will be great enough to overcome the resistance of springs 310 and 310' and the TV pressure acting in aid thereof. Under these circumstances the governor plug valve 314 and the second to third shift valve 305 will be moved to the right, forcing the regulator plug valve 316 also to the right. When this occurs, oil from the line 350 extending from the manual valve is fed through branch line 440 and restriction 441 to the bore between the lands 307 and 308 of the second to third shift valve 305, and may pass from the bore through the lines 390 and 442. This line 442 extends to the transition valve 270, at which valve it acts on the right end of the land 271 thereof, forcing the valve 270 to the left to cut off the supply of G–5 oil in the lines 267 and 275 to the controlled coupling valve. Line 275 in turn is then connected to a line 444 which extends to a port in the bore of the third to fourth shift valve 320, which bore at that point is in communication with exhaust at the port 445. With G–5 pressure thus exhausted from the controlled coupling valve 280, the spring 299 immediately moves that valve from its right-hand position to its left-hand position, i.e., that illustrated. When this occurs the communication between lines 298 and 425 is interrupted and instead thereof the line 425 is placed in communication with an air vent at the port 450. At the same time communication is interrupted between the branch line 375 and the line 435 extending to the coupling exhaust valves 40, and instead thereof the line 435 is placed in communication with an exhaust port at 451. With pump pressure removed from the exhaust valves 40, they are free to move outwardly to the position illustrated, opening the through exhaust passages 46 for the emptying of oil from the coupling D. The emptying of this coupling is expedited by the interruption of the supply of oil to the hub thereof and the connection of the supply line 425 to an air vent 450. As the coupling is being exhausted, the transmission of torque from the pump to the turbine thereof decreases, with the result that the turbine slows down and eventually comes to a complete halt, but is prevented from rotating in the reverse direction due to its connection to the sleeve shaft 20 which is prevented from reverse rotation by the one-way brake elements 55. This again establishes reduction drive in the front planetary unit B.

Simultaneously with the change of condition in the front unit B a change of condition in the rear unit F is effected. Oil being supplied through the lines 350, 440, and restriction 441 to the line 390 continues therefrom to the line 381 leading to the accumulator 382. Line 390 extends to the piston 82 of the rear planetary unit clutch L. This clutch is engaged at a rate depending on the pressure exerted thereon by the accumulator 382.

The action of the accumulator 382 is influenced by throttle valve pressure in a manner to be described but which action forms no part of the present invention and constitutes the subject matter of an application filed in the name of John J. O'Malley, Serial No. 477,856 filed December 27, 1954, for Valving Associated With a Variable Capacity Pump. Referring particularly to Figure 9, throttle valve pressure from line 461 through the bypass line 701 and restriction 702 extends to the accumulator limit valve indicated generally at 800. The body of this valve has a bore therein in which is slidably mounted a valve member 801 having a land 802 of one diameter and another land 804 of smaller diameter. The lower end of the bore is closed by a plug 806 held in place by a pin 808. The upper end of the valve 801 has a stem 810 surrounded by a spring 812 preloaded to exert a predetermined downward force on the valve 801. The body of the valve is ported for the entry of oil through the line 461 and has a spaced port connected to line 814 which is extended to a port in the casing of the accumulator 382. A branch line 816 from line 814 extends to a port in the bore of the valve to permit oil in line 816 to enter the bore between the plug 806 and the land 802. Assuming that the spring 812 is so preloaded as to exert an effective force on the land 804 of the valve of the order of 22 p.s.i., it follows that oil under throttle valve pressure entering the bore of the valve between lands 804 and 802 will continue therefrom through the line 814 to the casing of the accumulator. Oil will also pass through the branch line 816 to act on the lower end surface of land 802. Due to the preload of spring 812 oil under throttle valve pressure will continue at that pressure to the accumulator 382 to act on the entire upper area of the piston 384 since the oil introduced in the casing can continue into the interior of the piston skirt through the opening 820. This throttle valve pressure aids the springs 385 and 386 in resisting filling of the accumulator by oil from line 381 and the resistance offered to such filling increases as throttle valve pressure increases. However, as soon as throttle valve pressure exceeds the preloading of spring 812 continued rise in throttle valve pressure will result in the oil passing into line 814 becoming modulated with a subsequent increase in pressure lower than the increase in throttle valve pressure but proportionate thereto. This modulation is due to the difference in area of the lands 802 and 804 of the accumulator limit valve 800 causing this valve to act as a regulator. Oil in the space between lands 802 and 804 exerts a downward pressure on the valve 801 to a degree resulting from the difference in the areas of these two lands and since land 802 is larger, the force exerted downwardly on land 802 is greater than the force exerted upwardly on land 804. This force of course is augmented by spring 812. Consequently a higher pressure in the branch line 816 and action on the lower surface of land 802 is required to raise the valve upwardly to close the port connected to line 814. So long as the pressure in the line 814 reflected on the lower end of land 802 balances the differential pressure on the upper surface of land 802 and the loading of spring 812, the valve will remain with the port connected to line 814 closed. Should throttle valve pressure supplied by line 461 be reduced, the pressure in line 814 and on the lower end of land 802 will lift the valve 801 upwardly still further causing the land 802 to open a port connected to the exhaust passage 822 thereby permitting some of the oil to be exhausted until the pressures are again in balance. This regulating action will continue and the pressure in line 814 will increase in proportion to throttle valve pressure until, for example, when throttle valve pressure is at its maximum, i.e., pump pressure of 95 p.s.i., the pressure in line 814 and acting on the accumulator piston 384 will be of the order of 40 p.s.i.

Due to this regulating action by valve 800, the timing of the engagement of the rear clutch L will be in accordance with throttle valve pressure. For low throttle valve pressure the accumulator 382 acts to cushion the engagement of clutch L over a longer period than is true when high throttle valve pressure occurs. In the latter situation such modulated throttle valve pressure in line 814 augmented by the springs in the accumulator resists filling of the accumulator from line 381 so that the clutch L is quickly engaged.

When the clutch L is engaged the ring gear 78 is compelled to rotate at the same speed as the sleeve shaft 70 which is splined to the carrier 18 of the front unit B and which is the speed of rotation of the pump 14 of the main coupling A. At the same time the sun gear 75 of the rear unit is rotating at the same speed as the turbine 15 of coupling A so that, with the difference due to the inherent slip in the coupling, the sun gear 75 and the ring gear 78 rotate substantially in unison. This causes pinions 76 and carrier 77 to rotate as if the planetary unit were locked up, with an attendant same speed of rotation for the output shaft 100. The transmission under these conditions is operating with the front unit B in reduction drive and the rear unit F in direct drive, with the overall reduction ratio being that of the front unit only.

A branch line 468 from the line 442 extends to the left end of the land 294 of the limit valve 290, at which area it applies pressure to oppose the spring 296. This aids the oil acting on the land 291 in holding the limit valve open for a purpose which will be evident in connection with the next shift in the transmission. It is to be understood, however, that the line 468 can be eliminated if desired, in which event the spring 296 alone will be relied upon to prevent depletion or reduction in pressure.

Shift third to fourth

As the vehicle accelerates a point will be reached at which the G-1 and G-2 pressures developed by the governor 230, and applied respectively to the land 321 of the third to fourth shift valve 320 and land 327 of the third to fourth governor plug valve 326, will be high enough to overcome the resistance of spring 334 and modulated TV pressure supplied through line 407 to the right side of land 321, moving the entire third to fourth shift valve train to the right. Upon this movement, land 324 closes the exhaust port 445 while land 322 places a line 480 from the manual valve line 350 in communication with the line 444 which extends to the transition valve 270 and from the bore of this valve through the line 275 to the left end of land 281 of the controlled coupling valve 280. Since the oil so supplied is at full pump pressure, its pressure is sufficient to overcome the resistance of spring 299 aided by the TV pressure acting on the plug 288, since land 281 is of greater diameter than plug 288. The controlled coupling valve therefore is immediately moved to the right, reestablishing the supply of oil to the controlled coupling D through the lines 425 and 435, whereupon the controlled coupling is filled and causes a transition in the front unit from reduction drive to direct drive in the manner explained in connection with the first to second shift. The rear unit F remains in direct drive with the overall result that the entire transmission is in direct drive.

When the transmission is operating in fourth speed ratio the torque demand on the rear unit clutch L is not as great as in lower speed ratios even though the speed of the vehicle may be higher, with the result that the clutch L can be held engaged with a lower hydraulic force than that required to sustain the torque being transmitted in third speed ratio. Consequently, when the third to fourth shift valve train has moved to the right the line 355, which communicates with line 354 extending to the bore of the manual valve body, is placed in communication through the bore of the governor plug valve 326 with a line 495 which extends to the upper surface of the land 136 of regulator valve 130. The oil so supplied to this land 136 acts in opposition to the spring 133 so that this spring cannot exert its full force in the regulating action of the valve; consequently, the regulated line pressure drops to as much as 65 p.s.i. instead of 95 p.s.i. This reduction in regulated pressure reduces the load on the pump 60, with a consequent reduction in horsepower necessary to drive this pump.

The reduction in line pressure does not take place until the front unit B has been conditioned for direct drive by filling of the controlled coupling D. The delay in the reduction in line pressure is due to two factors, the first of which is the restriction 354' in line 354 adjacent to the bore of the manual valve body. This restriction reduces the flow of oil in lines 354 and 495. The second factor is the ball check valve 370, the ball of which is under the force of oil in the line 298' branched from the coupling supply line 298. Should a considerable quantity of oil be required to fill the coupling, the pressure in line 298 and consequently in line 298' may drop a few pounds, relieving pressure on the ball 372. Therefore, if the pressure in the line 495 is higher than that in the line 298', the pressure in line 495 will continue through the branch 495' to unseat the ball 372 so that this oil under higher pressure can enter line 298 and assist in filling the coupling D. As soon as the pressures on each side of the ball are equal, the spring 371 will seat ball 372 so that the full force of the oil in line 495 can then be directed to the pressure regulator valve.

At some predetermined speed of rotation the output shaft 100, as evidenced by the G-1 pressure developed thereby, such pressure, being supplied through the branch line 496 to the right end of the bypass valve 126 moves this valve to the left against spring 128, placing the line 125 from the outlet of the rear pump 120 in communication with the line 127 which is connected to the input or suction line 121. The result of such movement of the bypass valve is to in effect short circuit the rear pump 120 so that the pump 120 is under no load and consumes no energy of any appreciable amount. The entire burden of supplying oil to the transmission when such bypass takes place is assumed by the front pump 60.

This bypassing of the rear pump is dependent on output shaft speed and not on the ratio of the transmission. In fact, the rear pump 120 could be eliminated except that some source of hydraulic pressure driven by the output shaft is required for supplying hydraulic pressure to the transmission during push starting of the vehicle engine. If desired, the bypass valve 126 may be omitted so that the full output of pump 120 is available whenever this pump is in operation.

The transmission will remain in fourth speed under normal driving conditions unless the operator of the vehicle consciously makes an effort to shift the transmission from fourth speed to third speed. This may be done under certain conditions in either one of three ways.

Advanced throttle fourth to third shift

When the third to fourth shift valve is moved to position establishing fourth speed ratio, the port connected to line 405 which line supplies TV pressure is closed by the land 325 interrupting communication between line 405 and line 406 which leads to the right end of the regulator plug valve 330. Throttle valve pressure from line 405 is therefore interrupted but when the third to fourth shift has been completed, throttle valve pressure is again supplied to line 406 and thence to plug 330 by the connection within the valve bore of line 485 with line 406. Line 485 extends from the third to fourth shift valve to a port in the throttle valve to the right of the valve portion 184 and the bore of the throttle valve at this location is connected by line 200 to the metering part of the throttle valve. Consequently full throttle valve pressure by way of the lines 200 and 485 is again supplied to the regulator plug 330. Assuming that the vehicle is operating below a predetermined speed, for example 35 or 40 m.p.h., the operator may compel a shift in the transmission from fourth to third by depressing the accelerator to a position approaching full throttle position. Such movement by the accelerator of the throttle valve causes the metered throttle valve pressure to approach maximum which is full pump pressure. At the relatively low vehicle speed just mentioned, such high throttle valve pressure is sufficient to move the plug 330 to the left against governor pressure which will be relatively low at this speed. In this manner maximum TV pressure is applied to the right end of the land 331 of valve 330, and governor pressure at speeds below the predetermined maximum will not be high enough to prevent this maximum TV pressure from moving the entire train to the left to the illustrated position of the valve 320 and the plug 326. Such movement closes the port connected to line 480 and connects the line 444 in communication with line 275 to exhaust at the port 445. This exhausts the pressure holding the controlled coupling valve in its upshifted position with the immediate result that the spring 299 forces the valve to the illustrated or downshaft position, discontinuing supply of oil to the controlled coupling D so that it can become exhausted to reestablish reduction drive in the front planetary unit B. Operation of the transmission will then continue in the newly established third speed ratio until governor pressure, represented by the G–1 and G–2 pressures, becomes high enough to overcome the maximum TV pressure just applied to the valve train. When this occurs the transmission again will be shifted to fourth speed ratio in the manner previously described.

Pressure drop signal valve

Since the just mentioned forced shift from fourth to third speed ratio requires throttle valve pressure approaching full pump pressure and since pump pressure is reduced from the order of 95 p.s.i. to 65 p.s.i. after the transmission has been conditioned for fourth speed operation, provision is made for permitting throttle valve pressure to increase. This is accomplished by the action of the pressure drop signal valve 205', the bore of which serves as a connecting passage for the lines 354 (from the manual valve) and 355 to the bore of the third to fourth shift valve at the region of the governor plug valve 326. Full throttle valve pressure is supplied to the right end of the land 208 of valve 205' by the line 201 connected to the line 200. Spring 211 acting on the left end of land 206 of valve 205' is so preloaded that when throttle valve pressure supplied by line 201 reaches, for example, 50 p.s.i., spring 211 will yield and the valve 205' will be moved to the left the full permissible extent. Such movement to the left of valve 205' causes land 207 thereof to close the port connected to line 354 and to open the port connected to line 355 to exhaust at the port 505. Exhaust of line 355 in turn exhausts line 495 which extends to the regulator valve 130 removing this pump pressure from the regulator valve so that it again functions to deliver full regulated pump pressure, i.e., 95 p.s.i. throughout the system.

It will be evident therefore that as soon as the throttle valve is moved to a position approaching wide open throttle the pressure drop signal valve is activated and the full regulated pump pressure is restored so that maximum throttle valve pressure for the throttle position is obtained which high pressure is necessary to move the third to fourth shift valve train from fourth speed position to third speed position. As an incidental the increase in line pressure also aids in maintaining the rear clutch L engaged with greater hydraulic force so that it can transmit the added torque developed by the engine under advanced throttle opening.

Detent fourth to third shift

Should the transmission be operating in fourth speed ratio with vehicle speed higher than the predetermined speed at which an advanced throttle downshift can be obtained, i.e., above 35 or 40 m.p.h. and below a predetermined maximum vehicle speed of, for example, 75 m.p.h., a forced shift from fourth speed ratio to third speed ratio can be accomplished by movement of the throttle to full throttle position and beyond which movement causes an extreme movement of the part 182 of the throttle valve. Such movement causes the land 184 of the part 182 to uncover a port connected to line 550 permitting oil supplied by the line 200 to continue through the line 550 to the second to third shift valve and also to continue through the line 550' to the right end of the detent valve 205 moving this valve to the left to the extent permitted by the spring 211. Inasmuch as movement of the throttle valve to full throttle position supplies oil practically simultaneously both to the detent valve 205 and the pressure drop signal valve 205', these two valves may be said to move in unison against spring 211. When the throttle is moved to detent position, i.e., a position beyond full throttle, oil under throttle valve pressure is supplied to the line 485 as before described but even though the throttle valve pressure is at its maximum it is not high enough to overcome governor pressure at the range of vehicle speed before mentioned; between 35 or 40 and 75 m.p.h. Consequently, added TV pressure is necessary to aid that supplied directly from the bore of the TV valve through the line 485. When the detent valve 205 is moved to the left a branch line 201' of line 201 from the throttle valve supply is placed in communication through the bore of the detent valve between lands 209 and 209' with a line 500 which extends to a port communicating with the left surface of land 331 and also in communication with the passage 407 which extends to the chamber 333 of the spring 334. This pressure supplied by way of the detent valve is also maximum TV pressure and exerts full force on the right surface of the land 321 of the third to fourth shift valve. The pressure thus applied to both lands 321 and 331 is sufficient to overcome governor pressure and move the third to fourth shift valve train to the left, reestablishing third speed ratio in the manner described in connection with full throttle downshift. Once the valve train has moved to the left, the regulator plug valve 330 again acts to modulate TV pressure as in the normal operation previously described.

Prior to the movement of the third to fourth shift valve from its fourth speed position to its third speed position, pump pressure has been restored to the normal regulated pressure, i.e., 95 p.s.i. by the action of the pressure drop signal valve 205'. As before mentioned, this valve is actuated whenever throttle valve pressure exceeds a predetermined value such as 50 p.s.i. so that the pump pressure is raised from the reduced figure to permit maximum throttle valve pressure to be obtained.

The transmission will remain in third speed until the predetermined maximum speed of the vehicle is reached, at which time governor pressure will again cause a shift of the third to fourth shift valve train to the right to change the ratio of the transmission from third speed to fourth speed.

Manual fourth to third shift

When the transmission is operating in fourth speed and below the predetermined maximum at which the downshift to third speed is permitted, such downshift can be accomplished by movement of the manual valve 170 to the intermediate or DR–3 position. Such movement uncovers the port connected to the line 351 so that oil from the main pump supply line 65 can pass through the bore of the manual valve into line 351 which is connected to a port in the bore of the detent valve 205, partially uncovered by the land 209'. The oil then can continue from the line 351 into line 500 and follow the course described in the preceding operation to cause the third to fourth shift valve 320 and governor plug 326 to be moved to the left, downshifting the transmission from fourth speed ratio to third speed ratio. Such downshifting immediately resupplies existing TV pressure through the lines 405 and 406 to the regulator plug valve 330. As a safety factor for preventing excessive speed of the engine, the parts and pressures in the system are so calibrated that an automatic shift from third speed thus manually established will take place at a predetermined output shaft speed.

Again, pump pressure is immediately restored to normal as in the other downshifts, but the restoration is accomplished in a slightly different fashion. Movement of the manual valve to establish Intermediate or Drive 3 Range operation causes the land 172 of the manual valve to interrupt the flow of oil from the pump supply line 65 to the line 354. The latter line in turn is connected to exhaust through the bore of the manual valve to the port 415. Exhaust of the line 354 permits the pressure regulator valve 130 to restore normal forward speed operating pressure.

After the completion of the manual fourth to third shift the front brake E may be applied in a manner to be described in connection with the description of operation in Intermediate or Drive 3 Range.

Intermediate or drive 3 range

The manual lever 170 can be moved to the Intermediate or Drive 3 Range position at any time. Such movement causes the land 173 of manual valve 170 to place the main supply line 65 in communication with the line 351 through the bore of the manual valve so that oil under pump pressure continues through the line 351 to the detent valve 205 and thence through the line 500 to the third to fourth shift valve train in the manner previously described in connection with a manual fourth to third shift. If the movement of the manual valve to the Intermediate position is made before motion of the vehicle is initiated, the end result will be that the transmission will automatically operate in the manner previously described, sequentially conditioning the transmission for drive in first speed ratio, second speed ratio, and then third speed ratio. Unless the vehicle speed exceeds a predetermined maximum, the transmission will not shift from third speed ratio to fourth speed ratio, because oil under pump pressure supplied from the manual valve, as just described, is present in the chamber 33, between land 321 of the third to fourth shift valve 320 and land 332 of the regulator plug valve 330. It will be evident that oil in the line 500 continues through the line 407 to the chamber just mentioned and, since it acts on the total end area of land 321, the third to fourth shift valve is held against motion to complete fourth speed ratio until governor pressure representative of a predetermined high vehicle speed can act to cause this upshift.

The front unit brake E is operated during certain phases of transmission operation in Drive Range 3 or Intermediate. When the manual valve 170 is moved to this position in the manner previously described, oil continuing from the manual valve through the line 351 also may continue through branch line 465 which extends to the controlled coupling valve 280. When this latter valve is in the closed position, i.e., that shown, the oil can continue through line 466 to the front unit brake valve 340. At this valve the oil from line 466 can act on the right end of land 341 to move it to the left in opposition to the throttle valve pressure supplied to the left end of land 342. If the throttle opening at the particular instant that oil is being supplied through line 466 is partial, the throttle valve pressure will be lower than pump pressure so that the oil acting on the right end of the valve 340 can move this valve against the lower throttle valve pressure, forcing oil from the bore of valve 340 through the restriction 410. The result will be that after the condition just stated has existed for an extended period the valve 340 will be moved to the left sufficient to cause land 341 to uncover the port connected to line 411, whereupon oil can continue through this line 411 to the piston 51 of the brake E. As throttle valve pressure is increased, it will be obvious that the interval required for completion of the application of the brake E will be extended; furthermore, if the throttle is at the full open position, with consequent maximum throttle valve pressure, this throttle valve pressure, being equal to pump pressure, will hold the valve 340 against movement to complete the hydraulic circuit for applying brake E.

This application of brake E is of particular importance in connection with operation of the transmission in third speed ratio, with the manual valve in the Intermediate or Drive Range 3 position. The transmission being restrained against a shift from third speed ratio to fourth speed ratio during normal driving conditions, some means is deemed advisable for providing engine braking in third speed ratio. The valve 340 provides such action since it is activated to apply the brake E only after third speed ratio has been fully established. The brake E locks the sun gear 19 against rotation in either direction so that upon reversal of torque flow through the transmission, such as when the vehicle is coating, engine braking is provided.

The system is conditioned for the operation of the valve 340 to apply the brake E whenever the manual valve is moved to the Intermediate or Drive Range 3 position, even if this is for the purpose of obtaining a manual fourth to third shift. If the transmission is operating in fourth speed ratio at less than full throttle, when the manual valve is thus positioned, the brake E can be applied, after an interval, for engine braking.

As before mentioned, the manual valve can be moved to the Intermediate Range position at any time so that advantage can be taken of the added acceleration afforded by third speed ratio drive at high vehicle speeds. Should the manual valve be moved to this Intermediate position while the transmission is operating in fourth speed ratio, the result will be a manual fourth to third downshift in the manner described under that heading.

It should be noted that whenever the manual valve 170 is moved to the Drive Range 3 position, the land 172 of the manual valve interrupts the flow of oil from pump supply line 65 to the line 354 having restriction 354' therein. This action prevents the passage of oil under any circumstances to the regulator valve 130 to reduce the pressure regulated thereby even though the transmission may be compelled to shift from third speed ratio to fourth speed ratio.

Detent third to second shift

Should the transmission be operating in third speed ratio below a predetermined vehicle speed with the manual valve either in the Drive 4 Range or Intermediate Range, a shift from third to second can be compelled by movement of the throttle and throttle valve element 182 to the so-called detent position which is beyond full throttle. Such movement is that discussed in connection with the detent fourth to third shift causing the land 184 to open the port connected to line 550. Throttle valve pressure is supplied to the detent valve 205 as previously described but has no effect since the third to fourth shift valve will be in its downshifted position. Supply of oil to the line 550, however, is effective when the transmission is in third speed ratio as distinguished from supply of oil to this line when the transmission is in fourth speed ratio. Line 550 extends to the bore containing the second to third governor plug 311, and since this plug in third speed ratio is moved to the right, the oil in line 550 can continue through line 401 to the right end of the regulator plug valve 316 to act on the entire surface area of land 317. When the vehicle is progressing at a speed below the maximum just mentioned, governor pressure is low enough to permit the oil under throttle valve control (maximum throttle valve pressure being line pressure) to move the entire second to third valve train to the left, reestablishing second speed operation in the transmission.

Movement of the second to third shift valve 305 to the left causes land 307 to close the port connected to line 440 (the supply line from the manual valve) and to connect line 390, its branch line 381, and line 442 to exhaust through the restriction 391. At the same time the line 565 is connected to the bore of the second to third shift valve 305 between lands 306 and 307. This line 565 can then receive some of the oil which is being forced into the bore of the shift valve for exhaust purposes. When this line 565 is opened and the restriction 391 is made effective to exhaust the lines utilized for establishing third speed operation, oil in the accumulator 382 is immediately forced therefrom by action of springs 385 and 386 on the piston 384. The restriction 391 retards exhaust of the system, but some of this oil being forced out of the accumulator can pass through the line 565 to the transition valve 270 to aid spring 274 in restoring this valve to the illustrated position. The spring and this pressure from the accumulator are opposed by the oil in the line 442 which is connected to the bore of the second to third shift valve, along with the oil from the accumulator and the oil from the rear clutch L (line 390). The hydraulic pressures on the opposite ends of the transition valve 270 will therefore be balanced so that spring 274 can move the transition valve to the right, reestablishing the supply of G-5 oil through the lines 267 and 275 to the controlled coupling valve 280. This G-5 pressure is then available to move the controlled coupling valve to the right to cause filling of coupling D, provided such movement is not opposed by high throttle valve pressure acting on the plug 288. Reduction of throttle valve pressure to permit this reestablishment of second speed ratio is due to the action of the accumulator 382 in conjunction with the ball check valve 700 and the by pass restriction 702. As the oil is quickly forced out of the accumulator by action of the springs, the piston 384 is moved downwardly, in effect creating a partial vacuum in the chamber of the accumulator connected to the throttle valve pressure supply line 461 by way of accumulator valve 800. Oil can be drawn into the reservoir from the throttle valve only through the restriction 702 since the check valve 700 operates to close the main line. Due to the size of this restriction 702, oil cannot be supplied from the throttle valve in sufficient quantity to fill the throttle valve chamber of the accumulator so that in effect suction is applied to the line 710 and to line 711 extending to the right of the plug 288 in the controlled coupling valve train. Throttle valve pressure acting on this plug 288 therefore will be reduced sufficiently to permit the G-5 pressure acting on the left end of the controlled coupling valve to move it to the position permitting filling of coupling D. Once this position has been achieved, the land 286 of the controlled coupling valve closes the port connected to line 710 so that even if throttle valve pressure does eventually become normal in the lines beyond the check valve 700, it will have no effect on the controlled coupling valve until this valve is again moved to position emptying the coupling D.

Movement of the regulator plug valve 316 to the left again causes modulated throttle valve pressure to be imposed on the right end of land 306 of the second to third shift valve 305 so that automatic shift from second speed ratio thus established to third speed ratio will take place normally, i.e., in accordance with throttle position and vehicle speed, the latter being represented by both G-1 and G-2 pressures from the governor.

It will be noted that movement of the detent valve 205 to the left will cause the distribution of oil both to the second to third shift valve train and to the third to fourth shift valve train. The effect of such distribution of oil to these two valve trains depends on the ratio in which the transmission is operating at the time the distribution is made. If the transmission is operating in fourth speed ratio, vehicle speed will be high enough to prevent any action of this detent oil on the second to third shift valve train. Should the detent position be maintained and vehicle speed reduced, eventually a condition will be reached at which time the third to second shift will take place.

*Manual third to second shift*

A shift from third speed ratio to second speed ratio can be compelled by movement of the manual valve 170 to the Low Range position. When such movement is made, the land 173 of manual valve 170 places the pump supply line 65 in communication with the line 352 which extends to the second to third shift valve train. A branch line 353 is connected to a port in the bore of the valve between lands 317 and 318 of the second to third regulator plug valve 316, from which location it can continue through line 402 to the spring chamber 313 between land 306 of the second to third shift valve 305 and the left end of land 318. The oil thus acting on land 306 being at full pump pressure will serve to move the second to third shift valve 305 and the second to third governor valve 311 to the left, provided vehicle speed is below a predetermined maximum. Movement of shift valve 305 to the left re-establishes second speed operation in the manner described in connection with the detent third to second shift.

In addition to the action of the oil on the land 306, oil in the line 352 continues through a bypass 566 to the left end of the land 315 of the governor valve 311. Land 315 is larger than land 309 so that the differential area will cause greater force to be applied to land 315 than to land 309. The purpose of this arrangement is to permit a shift from third to second by use of the manual valve at a higher vehicle speed than a similar shift could be accomplished by means of throttle and detent action. Consequently, when the transmission has been shifted from third to second by the manual valve, it will continue operating in second speed ratio until a higher vehicle speed has been reached, such as for example, 45 m.p.h.

*Low range operation*

The manual valve 170 can be moved to the Low Range position at any time, either while the transmission is in operation or in Neutral. Such movement of this valve places the main pump supply line 65 in communication with line 352 in the manner just described in connection with the manual third to second shift. If the transmission is in Neutral or is operating in first speed ratio when the manual valve is so moved, the result will be that oil will be applied to the left end of land 306 as just described, and the transmission under normal operating conditions will not advance beyond second speed ratio. Should the transmission be operating in fourth speed ratio at the time the manual valve is moved to the Low position, it will continue operating in fourth speed ratio until the vehicle speed drops to the predetermined maximum for second speed operation, at which time the transmission will be compelled to complete a shift to second speed ratio.

Assuming that the transmission is operating in second speed ratio as compelled by the manual valve being in Low Range position, and further assuming that a vehicle speed is reached higher than the predetermined maximum before specified, the result will be that the second to third shift valve will be moved to the right due to the combined governor pressures. When this occurs, the front and rear units will be conditioned for third speed ratio in the manner described with the normal second to third shift.

The controls are so arranged that whenever the manual valve 170 is moved to the Low Range position, the brake band 80 will be applied to the drum 79 to lock this drum, and consequently ring gear 78 of rear unit F, against rotation in either direction. This is to prevent overrun in the rear unit due to the reversal of torque transmission therethrough. This application of the brake band 80 is accomplished by oil supplied to the second to third valve body bore by line 352 being permitted to continue through line 650 to a servo indicated generally at 651. The oil entering the servo acts on piston 652 in opposition to springs 654 and 655 to move the piston and the stem 656 upwardly, as viewed in the drawing, to wrap the band 80 about the drum 79. It is to be understood that the brake band 80 will be applied as just described only when the second to third shift valve is in its downshifted or illustrated position. This is important since the manual valve can be moved to the low position at any time and it would be inadvisable to apply the brake band 80 while the transmission is operating in third or fourth speed ratio. Should the manual valve be moved to the low range position while operating in third or fourth speed ratio, the band 80 will not be applied until the second to third shift valve has downshifted and the rear unit of the transmission has begun operating in reduction drive. At this time the brake band 80 serves to prevent rotation of the ring gear of the rear unit in either direction as distinguished from operation in other ranges wherein the ring gear is capable of rotating freely in the forward direction.

Reverse

The manual valve can be moved to the Reverse position if the vehicle is at rest or has a forward motion not exceeding, for example 8 m.p.h. When the manual valve is so positioned, the lines 350, 351 and 352 are connected to exhaust at the port 570, permitting exhaust of the parts of the system employed for forward drive. In this position of the manual valve the main pump supply line 65 is connected to line 412 through the bore of the manual valve between lands 171 and 172. Oil can continue through the line 412 to the pressure regulator valve 130, acting on the low end of plug 139 to force it upwardly and also to force the valve 130 upwardly to the full permissible extent. When this occurs, oil from the front pump 60 entering the regulator valve from the line 67 will pass through the hollow core of the valve and out the opening 138 into the line 69 to move the slide 61 to its maximum pressure position. This assures higher pump pressure than is used for forward drive, in fact the pressure will be substantially doubled, to approximately 195 p.s.i. The oil under this increased pressure is simultaneously supplied to the reverse brake K through the line 416 to act on piston 114, thereby to lock the ring gear 104 against rotation. Oil under this high pressure also goes through the line 414 to the front unit brake valve 340 from which it continues through line 411 to the piston 51 of the brake E, engaging this brake to lock the sun gear 19 against rotation in either direction.

With the front unit brake engaged, the front unit is conditioned for reduction drive. This drive is imparted to the sun gear 75 of the rear unit so that with the ring gear 104 affording reaction in the reverse unit J, the transmission operates to cause rotation of the output shaft 100 in the reverse direction, in the manner previously described. Operation in reverse is permitted by the exhaust of the neutral brake G releasing the race 92 for rotation in either direction. Consequently, the ring gear 78 can rotate in reverse direction as is necessary during operation in reverse. The transmission will continue operating in Reverse regardless of the speed attained by the vehicle, as assurance of which oil from the line 412 is supplied through line 530 to the right end of the controlled coupling valve 280 in aid of spring 299. The presence of oil at this location and under the high pressure before mentioned acts as a positive bar against movement of the controlled coupling valve 280 to the right, which movement could cause filling of the coupling D.

Closed throttle downshifts

While the vehicle is being brought to rest, downshifts will occur in reverse order, but the points at which these shifts occur relative to vehicle speed are different from the points at which upshifts occur. This is due partially to the lowered throttle valve ressure may be negligible if the throttle is in closed position. The difference in shift points is also due to the difference in the size of lands of the shift valves. For example, it will be noted that the land 322 of the third to fourth shift valve 320 is larger than the land 324. Consequently, when oil from the line 480 passes between these two lands into the line 444, it will exert pressure on the exposed opposite end surfaces of the two lands and, since the area of the exposed end surface of land 322 is larger than the similar surface of land 324, greater pressure is exerted on land 322, tending to hold the third to fourth shift valve in upshifted position. Governor pressure acting on this valve train must therefore drop to a lower value than would be necessary to move the valve train to the right under a similar throttle valve pressure. The differential areas cause the creation of what is known in the art as hysteresis effects.

In the second to third shift valve 305 the land 307 is larger in diameter than the land 308 so that the closed throttle downshift will occur at a lower vehicle speed than that at which an upshift can occur under similar throttle valve pressure conditions.

Exhaust of the system

When the vehicle is brought to rest, the engine stopped, and the manual valve positioned either in Neutral or Park position, the system is exhausted in the following manner. The main coupling A may retain oil for an extended period, being exhausted solely by leakage therefrom. The planetary coupling D is exhausted into the casing through any of the exhaust valves 40 which may be located in a lowermost position. These valves are all forced outwardly by their respective springs 47 so that oil can drain out of the lowermost valve or valves 40 by way of the through passages 46. The front unit brake E is exhausted through the line 411, bore of the front unit brake valve 340, line 414, line 412 to the bore of the manual valve 170, and to exhaust at port 415. The neutral brake valve G is exhausted by line 387, restriction 388, line 350, to the open end of the bore of the manual valve 170. The rear unit clutch L is exhausted by the line 390, bore of the second to third shift valve 305, and exhaust port 391. The reverse brake K is exhausted by line 416, line 412, the bore of the manual valve 170, and exhaust port 415. In this fashion the friction engaging elements, the selective application of which is necessary for the establishment of torque trains through the transmission, are all released so that torque cannot be transmitted through the transmission in either direction.

The invention is to be limited only by the following claims.

What is claimed is:

1. In a transmission for a throttle controlled engine, gearing, fluid pressure operated mechanisms for so conditioning said gearing as to establish a plurality of forward speed ratios and reverse speed ratio, a shift valve train movable from a position in which said mechanisms establish a low speed ratio to a position to cause said mechanisms to establish a higher speed ratio through said gearing, a source of fluid under pressure, governor mechanism for metering fluid from said source in accordance with the speed of said transmission, fluid under pressure from said governor being supplied to said valve train to bias it in one direction, a throttle valve mechanism regulating pressure from said source in accordance with throttle position, a first path for fluid under pressure from said throttle valve mechanism to said valve train for biasing said valve train in the direction opposite to the biasing by pressure from said governor, said valve train when moved to position establishing the higher speed ratio interrupting said first path for fluid from said throttle valve mechanism to said valve train, and a second path for fluid under pressure from said throttle valve mechanism to said valve train completed when said train establishes said higher speed ratio for supplying fluid under pressure from said throttle valve mechanism to said valve train to move it from position establishing higher speed ratio when the pressure from said governor on said valve train is below a predetermined maximum, and a further valve movable by fluid under pressure from said throttle valve mechanism when said throttle is moved beyond full throttle portion for supplying fluid under pressure from said throttle valve mechanism to said shift valve train to move it from said second position to said first position when the pressure from said governor to said shift valve train is below a second higher predetermined maximum.

2. In a transmission for a throttle controlled engine, gearing, fluid pressure operated mechanisms for so conditioning said gearing as to establish a plurality of forward speed ratios and reverse speed ratio, a shift valve train movable from a first position in which said mechanisms establish a lower speed ratio to a second position to cause said mechanisms to establish the highest forward speed ratio through said gearing, a source of fluid under pressure, governor mechanism for metering liquid from said source in accordance with the speed of said transmission, fluid under pressure from said governor being supplied to said valve train to bias it in one direction, a throttle valve mechanism regulating pressure from said source in accordance with throttle position, a first path for fluid under pressure from said throttle valve mechanism to said valve train for biasing said valve train in the direction opposite to the biasing by pressure from said governor, said valve train when moved to said second position interrupting said first path for fluid from said throttle valve mechanism to said valve train, and a second path for fluid under pressure from said throttle valve mechanism to said valve train completed when said valve train is in said second position for supplying fluid under pressure from said throttle valve mechanism to said valve train to move it from said second position to said first position when the pressure from said governor on said valve train is below a predetermined maximum, and a further valve movable by fluid under pressure from said throttle valve mechanism when said throttle is moved beyond full throttle position for supplying fluid under pressure from said throttle valve mechanism to said shift valve train to move it from said second position to said first position when the pressure from said governor to said shift valve train is below a second higher predetermined maximum.

3. In a transmission for a throttle controlled engine, gearing, fluid pressure operated mechanisms for so conditioning said gearing as to establish a plurality of forward speed ratios and reverse speed ratio, a shift valve train movable from a first position in which said mechanisms establish a lower speed ratio to a second position to cause said mechanisms to establish a higher forward speed ratio through said gearing, a source of fluid under pressure, governor mechanism for metering fluid from said source in accordance with the speed of said transmission, fluid under pressure from said governor being supplied to said valve train to bias it in one direction, a throttle valve mehcanism regulating pressure from said source in accordance with throttle position, a first path for fluid under pressure from said throttle valve mechanism to said shift valve train for biasing said valve train in the direction opposite to the biasing by pressure from said governor, said valve train when moved to said second position interrupting said first path for fluid from said throttle valve mechanism to said valve train, and a second path for fluid under pressure from said throttle valve mechanism to said valve train completed when said valve train is in said second position for supplying fluid under pressure from said throttle valve mechanism to said valve train to move it from said second position to said first position when the pressure from said governor on said valve train is below a predetermined maximum and the pressure from said throttle valve approaches its maximum, and a further valve movable by fluid under pressure from said throttle valve mechanism when said throttle is moved beyond full throttle position for supplying fluid under pressure from said throttle valve mechanism to said shift valve train to move it from said second position to said first position when the pressure from said governor to said shift valve train is below a second higher predetermined maximum.

4. In a transmission for a throttle controlled engine, gearing, fluid pressure operated mechanisms for so conditioning said gearing as to establish a plurality of forward speed ratios and reverse speed ratio, a shift valve train movable from a first position in which said mechanisms establish a lower speed ratio to a second position to cause said mechanisms to establish a higher forward speed ratio through said gearing, a source of fluid under pressure, governor mechanism for metering fluid from said source in accordance with the speed of said transmission, fluid under pressure from said governor being supplied to said valve train to bias it in one direction, a throttle valve mechanism regulating pressure from said source in accordance with throttle position, a first path for fluid under pressure from said throttle valve mechanism to elements of said train for biasing said valve train in the direction opposite to the biasing by pressure from said governor, said valve train when moved to said second position interrupting said first path for fluid from said throttle valve to said valve train, and a second path for fluid under pressure from said throttle valve mechanism to an element of said valve train completed when said train is in said second position for supplying fluid under pressure from said throttle valve mechanism to said element of said valve train to move said train from said second position to said first position when the pressure from said governor on said valve train is below a predetermined maximum and the pressure from said throttle valve approaches maximum, and a further valve movable by fluid under pressure from said throttle valve mechanism when said throttle is moved beyond full throttle position for supplying fluid under pressure from said throttle valve mechanism to said shift valve train to move it from said second position to said first position when the pressure from said governor to said shift valve train is below a second higher predetermined maximum.

5. In a transmission for a throttle controlled engine, gearing, hydraulically operated mechanisms for so conditioning said gearing as to establish a plurality of forward speed ratios and reverse speed ratio, a shift valve train movable from a first position in which said mechanisms eastablish a lower speed ratio to a second position to cause said mechanisms to establish the highest forward speed ratio through said gearing, a source of liquid under pressure, governor mechanism for metering liquid from said source in accordance with the speed of said transmission, liquid under pressure from said governor being supplied to said valve train to bias it in one direction, a throttle valve regulating pressure from said source in accordance with throttle position, pressure from said throttle valve being supplied to a terminal element of said train when said train is in said first position and said terminal element being movable to permit said pressure to be applied to an intermediate element of said train for biasing said valve train in the direction opposite to the biasing by pressure from said governor, said valve train when moved to said second position interrupting said supply of liquid from said throttle valve to said valve train, and a connection from said throttle valve to said terminal element of said valve train completed when said train is in said second position for supplying liquid under pressure from said throttle valve to said terminal element to move said train from said second position to said first position when the pressure from said governor on said valve train is below a predetermined maximum and the pressure from said throttle valve approaches maximum, and a further valve movable by pressure from said throttle valve when said throttle is moved beyond full throttle position for supplying liquid under pressure from said throttle valve to said shift valve train to move it from said second position to said first position when the pressure from said governor to said shift valve train is below a second higher predetermined maximum.

6. In a transmission for a throttle controlled engine, gearing, a shift valve train movable to position causing said gearing to be conditioned for a predetermined speed ratio, a source of fluid under pressure, a valve for regulating the pressure delivered by said source, a throttle valve further regulating pressure regulated by said regulating valve in accordance with throttle position, means operable upon movement of said shift valve train to position establishing said predetermined speed ratio for so acting on said regulating valve as to cause the pressure delivered by said source to be reduced, and means subject to pressure from said throttle valve and actuated by a predetermined pressure to render said last mentioned means ineffective.

7. In a transmission for a throttle controlled engine, gearing, a shift valve train movable to position causing said gearing to be conditioned for highest forward speed ratio, a source of fluid under pressure, a valve for regulating the pressure delivered by said source, a throttle valve further regulating pressure regulated by said regulating valve in accordance with throttle position, means operable upon movement of said shift valve train to position establishing highest forward speed ratio for so acting on said regulating valve as to cause the pressure delivered by said source to be reduced, and means subject to pressure from said throttle valve and actuated by a predetermined pressure to render said last mentioned means ineffective.

8. In a transmission for a throttle controlled engine, gearing, a shift valve train movable to position causing said gearing to be conditioned for a predetermined speed ratio, a source of fluid under pressure, a valve for regulating the pressure delivered by said source, a throttle valve regulating pressure from said source in accordance with throttle position, means operable upon movement of said shift valve train to position establishing said predetermined speed ratio for delivering a control pressure to said regulating valve as to cause the pressure delivered by said source to be reduced, and a valve subject to pressure from said throttle valve and actuated by a predetermined pressure for interrupting the supply of control pressure to said regulating valve.

9. In a transmission for a throttle controlled engine, gearing, a shift valve train movable to position causing said gearing to be conditioned for highest forward speed ratio, a source of fluid under pressure, a valve for regulating the pressure delivered by said source, means operable upon completion of movement of said shift valve train to position establishing highest forward speed ratio for so acting on said regulating valve as to cause the pressure delivered by said source to be reduced, a throttle valve movable by engine throttle for regulating pressure from said source, and a valve moved by predetermined pressure from said throttle valve for causing said regulating valve to restore normal pressure from said source.

10. In a transmission for a throttle controlled engine, gearing, a shift valve train movable to position causing said gearing to be conditioned for highest forward speed ratio, a source of fluid under pressure, a valve for regulating the pressure delivered by said source, means operable upon completion of movement of said shift valve train to position establishing highest forward speed ratio for delivering a control pressure to said regulating valve to cause the pressure delivered by said source to be reduced, a throttle valve movable by engine throttle for regulating pressure from said source, and a valve moved by predetermined pressure from said throttle valve for interrupting the supply of said control pressure thereby to cause said regulating valve to restore normal pressure from said source.

11. In a transmission for a throttle controlled engine, gearing, a shift valve train movable to position causing said gearing to be conditioned for a predetermined speed ratio, a source of fluid under pressure, a valve for regulating the pressure delivered by said source, means operable upon completion of movement of said shift valve train to position establishing said predetermined speed ratio for delivering a control pressure to said regulating valve to cause the pressure delivered by said source to be reduced, a throttle valve movable by engine throttle for regulating pressure from said source, and a valve moved by predetermined pressure from said throttle valve for interrupting the supply of said control pressure thereby to cause said regulating valve to restore normal pressure from said source.

12. In a transmission for a throttle controlled engine, gearing, a shift valve train movable to position causing said gearing to be conditioned for a predetermined speed ratio, a source of fluid under pressure, a valve for regulating the pressure delivered by said source, a throttle valve movable by engine throttle for regulating pressure from said source, and a detent valve only moved by fluid pressure from said throttle valve upon throttle movement beyond full throttle position for opening a path for supplying fluid under pressure from said throttle valve to said shift valve train for automatically moving said shift valve train from position establishing said predetermined speed ratio.

13. In a transmission for a throttle controlled engine, gearing, a shift valve train movable to position causing said gearing to be conditioned for highest forward speed ratio, a source of fluid under pressure, a valve for regulating the pressure delivered by said source, a throttle valve movable by engine throttle for regulating pressure from said source, and a detent valve only moved by fluid pressure from said throttle valve upon throttle movement beyond full throttle position for automatically opening a path for supplying fluid under pressure from said throttle valve to said shift valve train for moving said shift valve train from position establishing highest forward speed ratio.

14. In a transmission for a throttle controlled engine, gearing, a shift valve train movable to position causing said gearing to be conditioned for highest forward speed ratio, a source of fluid under pressure, a valve for regulating the pressure delivered by said source, means operable upon completion of movement of said shift valve train to position establishing highest forward speed ratio for so acting on said regulating valve as to cause the pressure delivered by said source to be reduced, a throttle valve movable by engine throttle for regulating pressure from said source, a valve moved by pressure from said throttle valve upon throttle movement beyond full throttle position for automaticaly moving said shift valve train from position establishing highest forward speed ratio, and a valve actuated by predetermined pressure from said throttle valve for causing said regulating valve to restore normal pressure from said source.

References Cited in the file of this patent
UNITED STATES PATENTS

| | | |
|---|---|---|
| 2,667,085 | Ackerman | Jan. 26, 1954 |
| 2,766,639 | Rosenberger | Oct. 16, 1956 |
| 2,770,148 | Wayman | Nov. 13, 1956 |